US011391707B2

(12) United States Patent
Rainville et al.

(10) Patent No.: US 11,391,707 B2
(45) Date of Patent: Jul. 19, 2022

(54) LIQUID CHROMATOGRAPHY/MASS SPECTROMETRY METHODS FOR THE ANALYSIS OF POLAR MOLECULES

(71) Applicant: Waters Technologies Corporation, Milford, MA (US)

(72) Inventors: Paul D. Rainville, Princeton, MA (US); Kerri M. Smith, Marlborough, MA (US)

(73) Assignee: Waters Technologies Corporation, Milford, MA (US)

( * ) Notice: Subject to any disclaimer, the term of this patent is extended or adjusted under 35 U.S.C. 154(b) by 549 days.

(21) Appl. No.: 16/522,191

(22) Filed: Jul. 25, 2019

(65) Prior Publication Data
US 2020/0033304 A1 Jan. 30, 2020

Related U.S. Application Data

(60) Provisional application No. 62/711,093, filed on Jul. 27, 2018.

(51) Int. Cl.
  *B01D 15/38* (2006.01)
  *B01J 20/281* (2006.01)
  (Continued)

(52) U.S. Cl.
  CPC .......... *G01N 30/48* (2013.01); *B01D 15/327* (2013.01); *B01D 15/363* (2013.01);
  (Continued)

(58) Field of Classification Search
  CPC .............. G01N 30/48; G01N 30/7233; G01N 2030/027; G01N 2030/8818;
  (Continued)

(56) References Cited

U.S. PATENT DOCUMENTS

| 4,017,528 A | 4/1977 | Unger et al. |
| 6,528,167 B2 | 3/2003 | O'Gara |
| (Continued) | | |

FOREIGN PATENT DOCUMENTS

| EP | 3184157 A1 | 6/2017 |
| WO | 2016026286 A1 | 2/2016 |
| WO | 2017117304 | 7/2017 |

OTHER PUBLICATIONS

"EPA Method 547: Determination of Glyphosate in Drinking Water by Direct-Aqueous Injection HPLC, Post-Column Derivatization and Fluorescence Detection." Waters Application Notes 720006246en. (2008).

(Continued)

*Primary Examiner* — David J Bolduc
(74) *Attorney, Agent, or Firm* — Womble Bond Dickinson (US) LLP; Deborah M. Vernon

(57) ABSTRACT

A mixed-mode chromatography method for the determination of phosphorylated sugars in a sample is provided. The mixed-mode chromatography method includes obtaining a sample comprising at least one phosphorylated sugar. The sample is introduced onto a chromatography system. The chromatography system includes a column having a stationary phase material contained inside the column. The stationary phase material has a surface comprising a hydrophobic surface group and at least one ionizable modifier. The sample with a mobile phase eluent is flowed through the column, where the at least one phosphorylated sugar is substantially resolved and retained within seven minutes. The mobile phase eluent includes water with an additive and acetonitrile with the additive. The mobile phase eluent has a pH less than 6. The at least one phosphorylated sugar is detected using a detector.

23 Claims, 19 Drawing Sheets

(51) Int. Cl.
G01N 30/72 (2006.01)
B01D 15/32 (2006.01)
B01D 15/36 (2006.01)
G01N 30/02 (2006.01)

(52) U.S. Cl.
CPC ..... B01D 15/3847 (2013.01); G01N 30/7233 (2013.01); *G01N 2030/027* (2013.01)

(58) Field of Classification Search
CPC ..... G01N 2030/8836; G01N 2030/884; G01N 30/88; B01D 15/327; B01D 15/363; B01D 15/3847
See application file for complete search history.

(56) References Cited

U.S. PATENT DOCUMENTS

| | | | |
|---|---|---|---|
| 6,686,035 | B2 | 2/2004 | Jiang et al. |
| 7,175,913 | B2 | 2/2007 | O'Gara |
| 9,310,344 | B2* | 4/2016 | Liu .................. B01J 41/20 |
| 2004/0005633 | A1* | 1/2004 | Vandekerckhove ........................ G01N 33/6842 435/68.1 |
| 2006/0287834 | A1* | 12/2006 | Kearney ............ G01N 30/7233 702/27 |
| 2008/0220532 | A1* | 9/2008 | Alpert ...................... C07K 1/20 436/94 |
| 2013/0197200 | A1* | 8/2013 | Bian ........................ C07K 1/16 530/416 |
| 2013/0319086 | A1 | 12/2013 | Wyndham et al. |
| 2017/0153257 | A1* | 6/2017 | Patten .................. C12Q 1/6804 |
| 2017/0239355 | A1* | 8/2017 | Sharma ................ B01D 15/325 |
| 2018/0259494 | A1 | 9/2018 | Shah et al. |
| 2018/0298372 | A1* | 10/2018 | Funkner ............. C12N 15/1017 |
| 2019/0126241 | A1* | 5/2019 | Lauber ................... B01D 15/36 |
| 2019/0293530 | A1* | 9/2019 | Van de Bittner .. B01D 11/0492 |
| 2021/0041451 | A1* | 2/2021 | Jin ....................... C07K 14/005 |

OTHER PUBLICATIONS

"Guidance document on analytical quality and method validation procedures for pesticide residue analysis in food and feed." Sante, Commission of the European Communities (2015) Document No. Sante/11945/2015. Rev. 0, implemented by Jan. 1, 2016.

"Ion Chromatography." Thermo Fisher Scientific. Retrieved on Jul. 24, 2019. <https://www.mayomedicallaboratories.com/test-catalog/Overview/80289>.

"Test ID: MMAS: Methylmalonic Acid (MMA), Quantitative, Serum." Mayo Clinic Laboratories. Retrieved on Jul. 24, 2019. https://www.mayocliniclabs.com/test-catalog/Overview/80289.

"Water quality—Determination of glyphosate and AMPA—Method using high performance liquid chromatography (HPLC) with tandem mass spectrometric detection." International Standard: ISO 16308:2014(E). Sep. 15, 2014.

Anastassiades et al. "Quick Method for the Analysis of Numerous Highly Polar Pesticides in Foods of Plant Origin via LC-MS/MS involving Simultaneous Extraction with Methanol (QuPPE-Method)." Version 9.3 (Aug. 2017, Document History, see p. 73). EURL-SRM: EU Reference Laboratories for Residues of Pesticides: Single Residue Methods.

Bajad et al. "Separation and quantitation of water soluble cellular metabolites by hydrophilic interaction chromatography-tandem mass spectrometry." J. Chromatogr. A. 1125(2006):76-88.

Chamkasem, et al., "Direct Determination of Glyphosate, Glufosiante, and AMPA in Soybean and Corn by Liquid Chromatography/Tandem Mass Spectrometry," Analytical and Bioanalytical Chemistry, Research Paper (2016).

Chunyan, et al., "Direct Aqueous Determination of Glyphosate and Related Compounds by Liquid Chromatography/Tandem Mass Spectrometry using Reversed-Phase and Weak Anion-Exchange Mixed-Mode Column," Journal of Chromatography A, 1218 (2011) 5638-5643.

Fiori et al. "Cellular and mitochondrial determination of low molecular mass organic acids by LC-MS/MS." J. Pharma. Biomed. Anal. 150(2018): 33-38.

Fussell et al. "Analysis of Polar Ionic Pesticides by IC-MS: Possible Solution to a Long-Standing Problematic Analysis?" Thermo Scientific. 2017. <http://tools.thermofisher.com/content/sfs/posters/PO-72369-IC-MS-Polar-Ionic-Pesticides-ASMS2017-PO72369-EN.pdf>.

Gritti et al. "Adsorption behaviors of neutral and ionizable compounds on hybrid stationary phases in the absence (BEH-C18) and the presence (CSH-C18) of immmobile surface charges." J. Chromatogr. A. 1282(2013): 58-71.

Gritti et al. "Effect of the ionic strength on the adsorption process of an ionic surfactant onto a C18-bonded charged surface hybrid stationary phases at low pH." J. Chromatogr. A. 1282(2013): 46-57.

Gritti et al. "Effect of the pH and the ionic strength on overloaded band profiles of weak bases onto neutral and charged surface hybrid stationary phases in reversed-phase liquid chromatography." J. Chromatogr. A. 1282(2013): 113-126.

Hinder et al. "Decreased glycolytic and tricarboxylic acid cycle intermediate coincide with peripheral nervous system oxidative stress in a murine model of type 2 diabetes." J. Endocrinol. 216(2013): 1-11.

International Search Report and Written Opinion relating to International Application No. PCT/IB2018/051486, 15 Pages, dated Jun. 13, 2018.

Iraneta et al. "A Review of Waters Hybrid Particle Technology. Part 3. Charged Surface Hybrid (CSH) Technology and Its Use in Liquid Chromtography." Waters white paper 720003929en. 2011.

Lu et al. "Metabolomic Analysis via Reversed-Phase Ion-Pairing Liquid Chromatography Coupled to a Stand Alone Orbitrap Mass Spectrometer." Anal. Chem. 82(2010): 3212-3221.

Luo et al. "Simultaneous determination of multiple intracellular metabolites in glycolysis, pentose phosphate pathway and tricarboxylic acid cycle by liquid chromatography-mass spectrometry." J. Chromtogr. A. 1147(2007): 153-164.

Mallet. "Analysis of Glysophase, Glufosinate, and AMPA in Tap and Surface Water Using Open-Architecture UPLC with 2D-LC Technology." Waters Application Notes 720005169en. (2014).

Masia, et al., "Determination of Pesticides and Veterinary Drug Residues in Food by Liquid Chromatography-Mass Spectrometry: A Review," Analytica Chimica Acta 936 (2016) 40-61.

Melo et al. "Brief Review Analytical Methods for the Determination of Glyphosate." MOJ Toxicol. 4.2(2018): 00088.

Michopoulos et al. "Targeted profiling of polar intracellular metabolites using ion-pair-high performance liquid chromatography and -ultra high performance liquid chromatography coupled to tandem mass spectrometry: Applications to serum, urine and tissue extracts." J. Chromatogr. A. 1349(2014): 60-68.

Neue et al. "Adsorption of cations onto positively charged surface mesopores." J. Chromatogr. A. 1318(2013): 72-83.

Novakova et al. "Evaluation of new mixed-mode UHPLC stationary phases and the importance of stationary phase choice when using low ionic-stregnth mobile phase additives." Talanta. 93(2012): 99-105.

Pihlström, et al., Revisions to Document N° Sante /2013 / 12571 titled, "Analytical Quality Control and Method Validation Procedures for Pesticide Residues Analysis in Food and Feed," 48 Pages, Jan. 1, 2016.

Rustin et al. "Inborn errors of the Krebs cycle: a group of unusual mitochondrial diseases in human." Biochim. Biophys. Acta. 1361(1997): 185-197.

Smith et al., ed. "March's Advanced Organic Chemistry." Seventh Edition. Hoboken, NJ: John Wiley & Sons. (2007): 1-2357.

Steinborn, et al., "Determination of Glyphosate Levels in Breast Milk Samples from Germany by LC-MS/MS and GC-MS/MS," J. Agric. Food Chem. (2016), 64, 1414-1421.

Tan et al. "Derivatization of the tricarboxylic acid intermediates with O-benzylhydroxylamine for liquid chromatography-tandem mass spectrometry detection." Anal. Biochem. 465(2014): 134-147.

(56) References Cited

OTHER PUBLICATIONS

Van Genderen-de Kloe et al. "Analysis of Glyphoste, AMPA, and Glufosinate in Water Using UPLC-MS/MS." Waters Application Notes 720006246en. (2018).
Waters Corporation, "Controlling Contamination in LC/MS Systems—Best Practices," 715001307 Rev. G, 33 Pages, (2016).
Winfield et al. "Method 547: Determiantion of Glyphosate in Drinking Water by Direct-Aqueous Injection HPLC, Post-Column Derivatization and Fluorescence Detection." U.S. Environmental Protection Agency: Enivironmental Monitoring Systems Laboratory, Office of Research and Development. Jul. 1990.
Wuyts, et al., "Highly Sensitve Analysis of Polar Pesticides in Food Matrices on the Xevo TQ-XS," Waters Corporation Technology Brief, (Oct. 2016).
Yang et al. "Analysis of Glyphosate and AMPA in Environmental Water by Ion Chromatography Electrospray Tandem Mass Spectrometry (IC-ESI-MS/MS)." Thermo Scientific: Application Note: 491.2010.
Yoshioka et al. "Rapid determination of glyphosate, glufosinate, bialaphos, and their major metabolites in serum by liquid chromatography-tandem mass spectrometry using hydrophilic interaction chromatography." J. Chromatogr. A. 1218(2011):3675-3680.
Cruz et al. "Metabolite profiling of Calvin cycle intermediates by HPLC-MS using mixed-mod stationary phases." Plant J. 55(2008): 1047-1060.
Gilar et al. "Mixed-mode chromatography for fractionation of peptieds, phosphopeptides, and sialylated glycopepetides." J. Chromatogr. A. 1191(2008): 162-170.
Lucie et al. "Evaluation of new mixed-mode UHPLC stationary phases and the importance of stationary phase choice when using low ionic-strength mobile phase additives." Talanta. 93(2012): 99-105.
Saari-Nordhaus et al. "Ion Chromatographic Separation of Inorganic Anions and Carboxylic Acids on a Mixed-Mode Stationary Phase." Anal. Chem. 64(1992): 2283-2287.
International Search Report and Written Opinion issued in International Patent Application No. PCT/IB2019/056379 dated Nov. 29, 2019.

* cited by examiner

TIME

LIQUID CHROMATOGRAPHY/MASS SPECTROMETRY METHODS FOR THE ANALYSIS OF POLAR MOLECULES

CROSS-REFERENCE TO RELATED APPLICATIONS

This application claims priority to and benefit of U.S. provisional patent application No. 62/711,093 filed on Jul. 27, 2018 and entitled "Liquid Chromatography/Mass Spectrometry Methods for the Analysis of Polar Molecules," the entire contents of which is hereby incorporated by reference.

FIELD OF THE TECHNOLOGY

The present disclosure relates to a liquid chromatography (LC)/mass spectrometry (MS) methods for the analysis of polar molecules. More specifically, the present disclosure relates to LC/MS methods for the analysis of phosphorylated sugars, amino acids, organic acids, and/or nucleotides.

BACKGROUND

Obtaining chromatographic retention of acidic, highly-polar molecules such as organic acids, amino acids, phosphorylated sugars, and nucleotides can prove difficult with current chromatographic techniques. Current methodologies often incorporate the use of ion-pair reagents (Luo et al, Journal of Chromatography B, 1147, 2007, 153-164 and Lu et al, Analytical Chemistry, 2010, 82, 3212-3221), ion chromatography (IC) (for example Thermo Scientific® Dionex® ion chromatography system (commercially available from Thermo Fisher Scientific Inc. Waltham, Mass., USA)), or hydrophilic interaction chromatography (HILIC) (Bajad et al, Journal of Chromatography A, 1125, 2006, 76-88). In addition, the use of derivatization can be carried out as a means to reduce the polarity of molecules (Tan et al, Analytical Biochemistry, 465, 2014, 134-147) and to thereby make it possible to retain, separate and subsequently detect these analytes for the purposes of quantitative or qualitative analyses. However, these current methods can suffer negative results due to sample or diluent restrictions, needing specialized equipment, or an incompatibility with mass spectrometric (MS) detection. Moreover, the process to prepare specialized mobile phases for use in these methods is laborious and time-consuming.

SUMMARY

What is needed is a method to separate acidic polar molecules using common LC/MS techniques with standard mobile phases. The present technology solves the problems of the prior art by the use of charged surface hybrid (CSH) reversed phase/mixed-mode chromatographic materials along with standard reversed-phase LC and MS compatible conditions (e.g., mobile phases) for the retention and separation of phosphorylated sugars, amino acids, organic acids, and/or nucleotides. Improved methodologies in the analysis of these compounds is of importance to researchers, the medical community and pharmaceutical companies due to the direct involvement of these molecules in numerous disease states, such as cancer and diabetes. Further, the analysis of these molecules is of interest for the manufacturing of various products from bioreactors. (Hinder et al, Journal of Endocrinology, 213, 2013, 1-11 and Rustin et al, Biochimica et Biophysica Acta, 1361, 1997, 185-197.)

The charged surface hybrid reversed phase/mixed-mode sorbents applicable to these separations have been defined in United States Patent Publication Number 20130319086A1 entitled "High Purity Chromatographic Materials Comprising an Ionizable Modifier" the contents of which is incorporated herein by reference. In brief, a charged surface reversed phase material is a high purity chromatographic material (HPCM) having a chromatographic surface comprised of a hydrophobic surface group and one or more ionizable modifiers. These charged surface reversed phase/mixed-mode materials can have a ratio of hydrophobic surface group:ionizable modifier in the HPCM from about 2.5:1 to about 350:1. In some embodiments, the ratio of hydrophobic surface group:ionizable modifier is between about 4:1 to about 350:1 or from about 4:1 to about 22:1 or from about 5:1 to about 22:1. The charged surface reversed phase materials can have a concentration of ionizable modifier in the HPCM that is less than about 0.5 µmol/m$^2$. In some embodiments, the concentration of ionizable modifier is between about 0.03 µmol/m$^2$ and 0.5 µmol/m$^2$.

The use of the CSH sorbents with a reversed-phase liquid chromatography column results in mixed-mode chromatography, where more than one form of interaction between the analyte and the stationary phase is used for separation of the sample. The use of the CSH sorbents results in both hydrophobic interactions between the analyte and the sorbent (e.g., from the hydrophobic surface group) as well as anion exchange interactions between the analyte and the sorbent (e.g., from the ionizable modifier). In this application, the technology is directed to a mixed-mode chromatographic method in which hydrophobic interactions are one of the forms of interactions used for the separation. As a result, the technology can be said to be a mixed-mode/reversed phase chromatography system and method.

In one aspect, the technology relates to a mixed-mode chromatography method for the determination of phosphorylated sugars in a sample. The mixed-mode chromatography method includes obtaining a sample comprising at least one phosphorylated sugar. The sample is introduced onto a chromatography system that includes a column having a stationary phase material contained inside the column. The stationary phase material has a surface comprising a hydrophobic surface group and at least one ionizable modifier. The sample with a mobile phase eluent is flowed through the column. The at least one phosphorylated sugar is substantially resolved and retained within seven minutes. The mobile phase eluent includes water with an additive and acetonitrile with the additive. The mobile phase eluent has a pH less than 6. The at least one phosphorylated sugar is detected using a detector. The method can include one or more of the following embodiments.

In some embodiments, the pH of the mobile phase eluent is less than 5. The pH of the mobile phase eluent can be less than 3. In some embodiments, the pH of the mobile phase eluent is between about 2.5 and 3. The pH of the mobile phase eluent can be about 2.7

In some embodiments, the additive is 0.1% formic acid. The additive can a mass spectrometry compatible buffer. The mass spectrometry compatible buffer can be, for example, ammonium formate, ammonium acetate, or ammonium bicarbonate.

In one embodiment, the mobile phase eluent comprises a mobile phase A consisting essentially of 0.1% formic acid in water and a mobile phase B consisting essentially of 0.1% formic acid in acetonitrile. The mobile phase eluent can have a linear or step gradient elution comprising a.) 100% mobile phase A, 0% mobile phase B at an initial time; b.) 70% mobile phase A, 30% mobile phase B at a time of 3 minutes; c.) 5% mobile phase A, 95% mobile phase B at a time of 3.5 minutes; d.) 5% mobile phase A, 95% mobile phase B at a time of 6.5 minutes; and e.) 100% mobile phase A, 0% mobile phase B at a time of 7 minutes.

The sample with the mobile phase eluent can be flowed through the column at a rate from 0.2-1.0 mL/min. In some embodiments, the sample with the mobile phase eluent is flowed through the column at a rate of about 0.4 mL/min.

The hydrophobic surface group can be a fluoro-phenyl functional group. The hydrophobic surface group can be a phenyl-hexyl functional group. In some embodiments, the hydrophobic surface group is a $C_{18}$ functional group.

In general, the detector can be a mass spectrometer.

In another aspect, the technology relates to a mixed-mode chromatography method for the determination of amino acids in a sample. The mixed mode chromatography method includes obtaining a sample including at least one amino acid. The sample is introduced onto a chromatography system including a column having a stationary phase material contained inside the column. The stationary phase material has a surface comprising a hydrophobic surface group and at least one ionizable modifier. The sample with a mobile phase eluent is flowed through the column. The at least one amino acid is substantially resolved and retained within seven minutes. The mobile phase eluent includes water with an additive (e.g., 0.1% formic acid) and acetonitrile with the additive (e.g., 0.1% formic acid). The mobile phase eluent has a pH less than 6. The at least one amino acid is detected using a detector. The method can include one or more of the following embodiments.

In some embodiments, the pH of the mobile phase eluent is less than 5. The pH of the mobile phase eluent can be less than 3. In some embodiments, the pH of the mobile phase eluent is between about 2.5 and 3. The pH of the mobile phase eluent can be about 2.7

In some embodiments, the additive is 0.1% formic acid. The additive can a mass spectrometry compatible buffer.

In one embodiment, the mobile phase eluent comprises a mobile phase A consisting essentially of 0.1% formic acid in water and a mobile phase B consisting essentially of 0.1% formic acid in acetonitrile. The mobile phase eluent can have a linear or step gradient elution comprising a.) 100% mobile phase A, 0% mobile phase B at an initial time; b.) 70% mobile phase A, 30% mobile phase B at a time of 3 minutes; c.) 5% mobile phase A, 95% mobile phase B at a time of 3.5 minutes; d.) 5% mobile phase A, 95% mobile phase B at a time of 6.5 minutes; and e.) 100% mobile phase A, 0% mobile phase B at a time of 7 minutes.

The sample with the mobile phase eluent can be flowed through the column at a rate from 0.2-1.0 mL/min. In some embodiments, the sample with the mobile phase eluent is flowed through the column at a rate of about 0.4 mL/min.

The hydrophobic surface group can be a fluoro-phenyl functional group. The hydrophobic surface group can be a phenyl-hexyl functional group. In some embodiments, the hydrophobic surface group is a $C_{18}$ functional group.

In general, the detector can be a mass spectrometer.

In some embodiments, the at least one amino acid is one or more of glutamate, glutamine, isoleucine, or leucine.

In another aspect, the technology relates to a mixed-mode chromatography method for the determination of organic acids in a sample. The mixed mode chromatography method includes obtaining a sample comprising at least one organic acid. The sample is introduced onto a chromatography system including a column having a stationary phase material contained inside the column. The stationary phase material has a surface comprising a fluoro-phenyl hydrophobic surface group and an ionizable modifier. The sample with a mobile phase eluent is flowed through the column. The at least one organic acid is substantially resolved and retained within seven minutes. The mobile phase eluent includes a mobile phase A consisting essentially of 0.1% formic acid in water and a mobile phase B consisting essentially of 0.1% formic acid in acetonitrile. The mobile phase eluent has a pH less than 6. The at least one organic acid is detected using a detector. The method can include any of the embodiments described herein.

The at least one organic acid can be one or more of isocitric acid, aconitic acid, a-ketoglutaric acid, lactic acid, or pyruvic acid.

This technology provides numerous advantages. For example, the technology allows for the separation of phosphorylated sugars, organic acids, amino acids and/or nucleotides in a quick manner, for example, under seven minutes. In addition, the technology allows for the separation of these analytes using common LC/MS techniques with standard mobile phases (e.g., water with 0.1% formic acid and acetonitrile with 0.1% formic acid), which are commonly available in analytical laboratories.

BRIEF DESCRIPTION OF THE DRAWINGS

The technology will be more fully understood from the following detailed description taken in conjunction with the accompanying drawings, in which.

DETAILED DESCRIPTION

Figure 1:
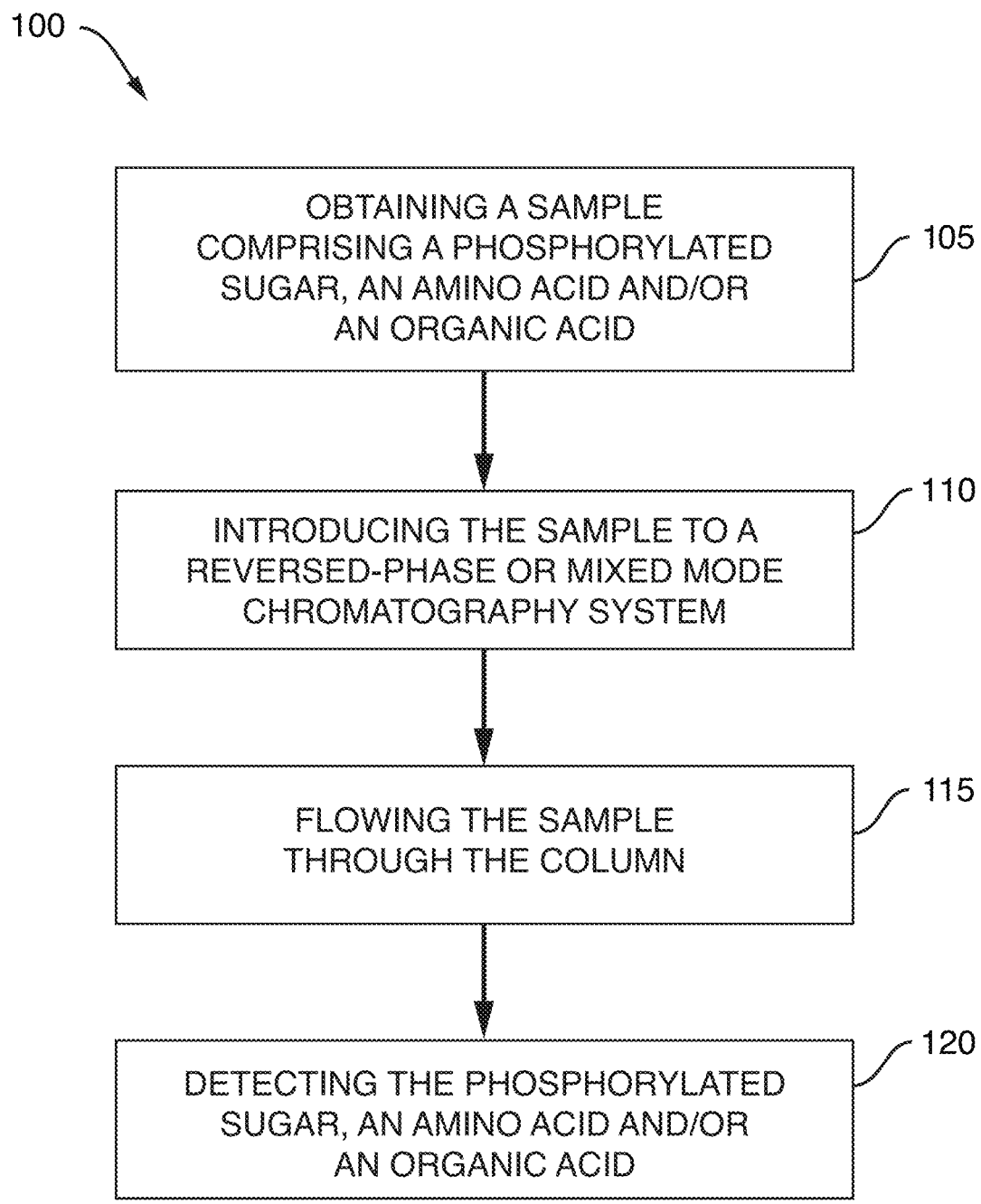
FIG. 1 is a flow chart of a mixed-mode chromatography method for the determination of a phosphorylated sugar, an amino acid and/or an organic acid in a sample, according to an illustrative embodiment of the technology.

The technology provides methods for chromatography separation and detection of polar molecules, for example, phosphorylated sugars, amino acids, organic acids, and/or nucleotides using a mixed-mode or reversed-phase chromatography column that includes a stationary phase material having a surface comprising a hydrophobic surface group and at least one ionizable modifier.

Definitions

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

As used herein, the term "high purity" or "high purity chromatographic material" includes a material which is prepared form high purity precursors. In certain aspects, high purity materials have reduced metal contamination and/or non-diminished chromatographic properties including, but not limited to, the acidity of surface silanols and the heterogeneity of the surface.

As used herein, the term "chromatographic surface" includes a surface which provides for chromatographic separation of a sample. In certain aspects, the chromatographic surface is porous. In some aspects, a chromatographic surface can be the surface of a particle, a superficially porous material or a monolith. In certain aspects, the chromatographic surface is composed of the surface of one or more particles, superficially porous materials or monoliths used in combination during a chromatographic separation. In certain other aspects, the chromatographic surface is non-porous.

As used herein, the term "ionizable modifier" includes a functional group which bears an electron donating or electron withdrawing group. In certain aspects, the ionizable modifier contains one or more carboxylic acid groups, amino groups, imido groups, amido groups, pyridyl groups, imidazolyl groups, ureido groups, thionyl-ureido groups or aminosilane groups, or a combination thereof. In other aspects, the ionizable modifier contains a group bearing a nitrogen or phosphorous atom having a free electron lone pair. In certain aspects, the ionizable modifier is covalently attached to the material surface and has an ionizable group. In some instances it is attached to the chromatographic material by chemical modification of a surface hybrid group.

As used herein, the term "hydrophobic surface group" includes a surface group on the chromatographic surface which exhibits hydrophobicity. In certain aspects, a hydrophobic group can be a carbon bonded phase such as a $C_4$ to $C_{18}$ bonded phase. In other aspects, a hydrophobic surface group can contain an embedded polar group such that the external portion of the hydrophobic surface maintains hydrophobicity. In some instances it is attached to the chromatographic material by chemical modification of a surface hybrid group. In other instances the hydrophobic group can be $C_4$-$C_{30}$, embedded polar, chiral, phenylalkyl, or pentafluorophenyl bonding and coatings.

As used herein, the term "hybrid", including "hybrid inorganic/organic material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium or oxides thereof, or ceramic material.

"Hybrid" includes inorganic-based structures wherein an organic functionality is integral to both the internal or "skeletal" inorganic structure as well as the hybrid material surface. As noted above, exemplary hybrid materials are shown in U.S. Pat. Nos. 4,017,528, 6,528,167, 6,686,035 and 7,175,913, the contents of each of which are incorporated hereby by reference.

As used herein, the term "surface modifiers" include (typically) organic functional groups which impart a certain chromatographic functionality to a chromatographic stationary phase. The porous inorganic/organic hybrid materials possess both organic groups and silanol groups which may additionally be substituted or derivatized with a surface modifier.

The language "surface modified" is used herein to describe the composite material of the present technology that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later cross-linking, imparting the chemical character of the surface modifier to the base material. In one embodiment, the organic groups of a hybrid material, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, *J. Advanced Organic Chemistry, 3rd Edition*, Wiley, New York, 1985.

Methods

FIG. 1 is a flow chart of a reversed phase or mixed-mode chromatography method 100 for the determination of phosphorylated sugars, amino acids, and/or organic acids in a sample. In some embodiments, the amino acid is glutamate, glutamine, isoleucine, or leucine. In some embodiments, the organic acid is a metabolite or intermediate of the tricarboxylic acid (TCA) cycle, for example, isocitric, citric, aconitic, a-ketoglutaric, succinic, malic, fumaric, lactic, pyruvic acid.

The reversed-phase/mixed mode chromatography method 100 includes obtaining a sample that includes the phosphorylated sugars, amino acids, and/or organic acids 105. In some embodiments, the sample includes phosphorylated sugars, amino acids, and organic acids. The sample can include one of a phosphorylated sugar, amino acid or organic acid, or any combination thereof. In some embodiments, the sample includes multiple different types or sugars, amino acids, and/or organic acids. In other embodiments, the sample can also include a nucleotide.

Figure 2:
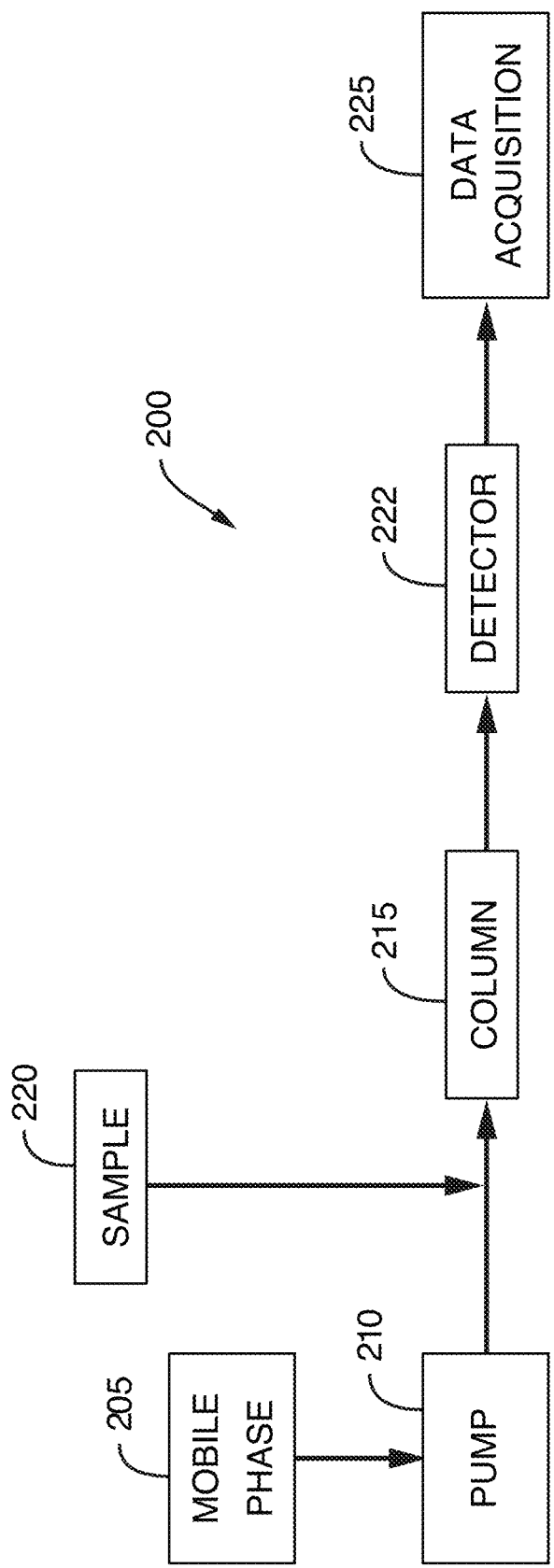
FIG. 2 is a schematic of a mixed-mode chromatography system, according to an illustrative embodiment of the technology.

The sample is introduced 110 to a reversed-phase/mixed-mode chromatography system. FIG. 2 is a schematic of an exemplary reversed-phase or mixed-mode chromatography system 200. The reversed-phase or mixed-mode chromatography system 200 includes a mobile phase reservoir 205 that stores a mobile phase eluent or multiple mobile phase eluents. A pump 210, pumps the mobile phase eluent(s) from the mobile phase reservoir 205 to the reversed-phase or mixed-mode chromatography column 215. A sample 220 is introduced into the mobile phase eluent flow stream prior to the reversed-phase or mixed-mode chromatography column 215. The sample 220 and the mobile phase combine prior to entering the reversed-phase or mixed-mode chromatography column 215, and form a combined flow stream.

The mobile phase eluent includes water with an additive and acetonitrile with an additive. The additive can be formic acid. In some embodiments, the additive is 0.1% formic acid. The additive can be a buffer that is compatible with mass spectrometry. The mobile phase eluent can consist of two separate mobile phases, mobile phase A and mobile phase B. Mobile phase A can consist essentially of 0.1% formic acid in water and mobile phase B can consist essentially of 0.1% formic acid in acetonitrile.

The mobile phase eluent can have a linear or step gradient elution. The linear or step gradient elution can be a. 100% mobile phase A, 0% mobile phase B at an initial time; b. 70% mobile phase A, 30% mobile phase B at a time of 3 minutes; c. 5% mobile phase A, 95% mobile phase B at a time of 3.5 minutes; d. 5% mobile phase A, 95% mobile phase B at a time of 6.5 minutes; and e. 100% mobile phase A, 0% mobile phase B at a time of 7 minutes.

The mobile phase eluent can have a flow rate between about 0.2 to about 1.0 mL/min. The mobile phase eluent flow rate can be about 0.2 mL/min, 0.3 mL/min, 0.4 mL/min, 0.5 mL/min, 0.6 mL/min, 0.7 mL/min, 0.8 mL/min, 0.9 mL/min, or 1.0 mL/min. These values can be used to define a range. In some embodiments the flow rate of the mobile phase eluent is about 0.40 mL/min.

The mobile phase eluent has a pH less than 6. In some embodiments the pH of the mobile phase eluent is less than 5. In other embodiments, the pH of the mobile phase eluent is less than 3. The pH of the mobile phase eluent can be 2.7. The pH of the mobile phase eluent can be 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0. These values can be used to define a range.

The reversed-phase or mixed-mode chromatography column 215 contains a stationary phase inside the column 215. The stationary phase material has a surface that includes a hydrophobic surface group and an ionizable modifier. In some embodiment, the hydrophobic surface group contains a phenyl functional group. The phenyl functional group can include unsubstituted and substituted phenyl groups. The stationary phase can include a fluoro-phenyl functional group or a phenyl-hexyl functional group. The stationary phase material can include inorganic/organic hybrid particles or ethylene bridged hybrid particles. The mean particle size can measure about 0.1 µm, 0.2 µm, 0.3 µm, 0.4 µm, 0.5 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8 µm, 1.9 µm, 2.0 µm, 2.1 am, 2.2 µm, 2.3 µm, 2.4 µm, 2.5 µm, 2.6 µm, 2.7 µm, 2.8 µm, 2.9 µm, 3.0 µm, 3.1 µm, 3.2 µm, 3.3 µm, 3.4 µm, 3.5 µm, 3.6 µm, 3.7 µm, 3.8 µm, 3.9 µm, 4.0 µm, 4.1 µm, 4.2 µm, 4.3 µm, 4.4 µm, 4.5 µm, 4.6 µm, 4.7 µm, 4.8 µm, 4.9 µm, 5.0 µm, 5.1 µm, 5.2 µm, 5.3 µm, 5.4 µm, 5.5 µm, 5.6 µm, 5.7 µm, 5.8 µm, 5.9 µm, 6.0 µm, 6.5 µm, 7.0 µm, 7.5 µm, 8.0 µm, 8.5 µm, 9.0 µm, 9.5 µm, 10.0 µm, 10.5 µm, 11.0 µm, 11.5 µm, 12.0 µm, 12.5 µm, 13.0 µm, 13.5 µm, 14.0 µm, 14.5 am, or 15 µm. These values can define a range. In one embodiment, the particle size is about 1.7 µm.

The functional group imparts a certain chromatographic functionality to a chromatographic stationary phase material. The hydrophobic surface group is attached to the base material (particle), for example, via derivatization or coating and later crosslinking, imparting the chemical character of the hydrophobic surface group or functional group to the base material (e.g., the inorganic/organic hybrid particles or ethylene bridged hybrid particles described above).

The ionizable modifiers and hydrophobic surface groups can be applied to a base particle using a variety of methods. For example, starting with an unbonded based particle (e.g., ethylene bridged hybrid particle (BEH)), a small controlled charge can be applied to the BEH particle surface. The resulting charged surface hybrid (CSH) particle can be then bonded and sometimes endcapped with the functional group, for example, a fluoro-phenyl functional group, a phenyl-hexyl functional group or a $C_{18}$ functional group.

The inorganic/organic hybrid particles possess both organic groups and silanol groups which can additionally be substituted or derivatized with a surface modifier. "Surface modifiers" include (typically) organic functional groups which impart a certain chromatographic functionality to a chromatographic stationary phase. The surface modifier can be, for example, a $C_{18}$ group, unsubstituted and substituted phenyl groups, a fluoro-phenyl, or phenyl-hexyl functional group. Examples of these functional groups are shown below.

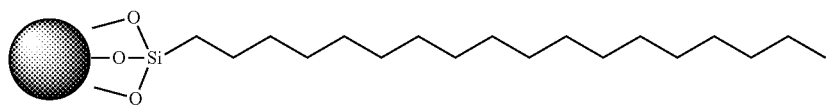 [SMILES: CCCCCCCCCCCCCCCCCC[Si](OC)(OC)OC]

Example of a stationary phase having a $C_{18}$ functional group.

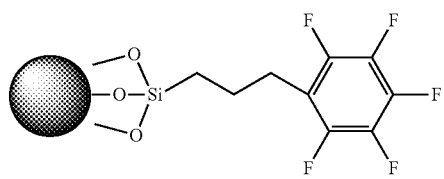 [SMILES: CO[Si](CCCc1c(F)c(F)c(F)c(F)c1F)(OC)OC]

Example of a stationary phase having a fluoro-phenyl functional group.

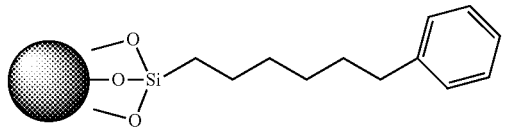 [SMILES: CO[Si](CCCCCCc1ccccc1)(OC)OC]

Example of a stationary phase having a phenyl-hexyl functional group.

Table 1 shows the properties of charged surface hybrid (CSH) bonded with $C_{18}$, fluoro-phenyl or phenyl-hexyl functional groups.

TABLE 1

Properties of CSH Bonded Phases

| | Surface Concentration ($\mu mol/m^2$) | Endcapping | % C | pH Range |
|---|---|---|---|---|
| CSH $C_{18}$ | 2.3 | yes | 15.5 | 1-11 |
| CSH Phenyl-Hexyl | 2.3 | yes | 13.5 | 1-11 |
| CSH Fluoro-Phenyl | 2.3 | no | 10.2 | 1-8 |

The anion-exchange characteristics of CSH bonded phases make them useful for separating polar acidic compounds (e.g., phosphorylated sugars, amino acids, organic acids, and/or nucleotides), which are typically poorly retained on reversed-phase columns. This is demonstrated for a number of different types of analytes in the Examples.

Referring back to FIG. 2, the reversed-phase chromatography column 215 can have any inner diameter that allows for the efficient separation of acidic polar compounds, e.g., phosphorylated sugars, amino acids, organic acids, and/or nucleotides. The inner diameter of the chromatography column 215 can be, for example, 0.05 mm, 0.075 mm, 0.1 mm, 0.2 mm, 0.3 mm, 0.4 mm, 0.5 mm, 0.6 mm, 0.7 mm, 0.8 mm. 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3 mm. These values can be used to define a range. In some embodiments, the inner diameter of the reversed-phase chromatography column 215 is 2.1 mm.

Similarly, the reversed-phase chromatography column 215 can have any length that allows for the separation of acidic polar compounds, e.g., phosphorylated sugars, amino acids, organic acids, and/or nucleotides. The length can be, for example, about 5 mm, 10 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm 150 mm, 200 mm, 250 mm, or 300 mm. These values can be used to define a range. In some embodiments, the length of the reversed-phase chromatography column 215 is 100 mm.

The reversed-phase chromatography system 200 can have a detector 222 positioned downstream of the column 215. The detector 222 can be used to detect the acidic polar compounds, e.g., phosphorylated sugars, amino acids, organic acids, and/or nucleotides eluting from the reversed-phase or mixed-mode chromatography column 215. The detector 222 can be a mass spectrometer. In some embodiments, the detector 222 is a tandem mass spectrometer (MS/MS). The detector can be a tandem quadrupole mass spectrometer.

A data acquisition module 225 can be in communication with the detector 222. The data acquisition module 225 can be used, for example, to gather/collect and analyze data received from the detector 222. The data acquisition module 225 can be a computer having software installed to collect and analyze the data.

Referring back to FIG. 1, the sample and mobile phase eluent (combined flow stream) are flowed 115 through the reversed-phase/mixed-mode chromatography column (e.g., column 215 of FIG. 2). The acidic polar compounds, e.g., phosphorylated sugars, amino acids, organic acids, and/or nucleotides are substantially resolved and retained on the column. In some embodiments, the phosphorylated sugars, amino acids, organic acids, and/or nucleotides are separated in about 7 minutes.

The retention time, resolution from other analytes in the sample and selectivity of analytes in a chromatography separation can be influenced by a number of factors. These factors can include the strong eluent or mobile phase, the pH of the sample and mobile phase as well as the profile and duration of the gradient. For example, a positively charged sorbent (e.g., a CSH sorbent) will attract negatively charged molecules (e.g., organic acids, phosphorylated sugars, amino acids and nucleotides). Therefore, these negatively charged analytes will be attracted to and retained on a positively charged sorbent. The mobile phase gradient can then be manipulated or changed to selectively release the negatively charged analytes to elute from the column. For example, decreasing the pH of the mobile phase eluent over time will result in the negatively charged analytes being released from the stationary phase material and will elute from the column.

The phosphorylated sugars, amino acids, organic acids, and/or nucleotides are detected 120 using a detector or multiple detectors, for example, detector 222 of FIG. 2. The detector can be used to detect the phosphorylated sugars, amino acids, organic acids, and/or nucleotides eluting from the reversed-phase/mixed mode chromatography column. The detector can be a mass spectrometer.

EXAMPLES

Example 1: Metabolites and Intermediates of the Tricarboxylic Acid (TCA) Cycle Standards were prepared in water and diluted with water to make a solution of 100 µmolar for metabolites and intermediates of the tricarboxylic acid (TCA) cycle, for example, isocitric, citric, aconitic, a-ketoglutaric, succinic, malic, fumaric, lactic and pyruvic organic acids. The structures of these metabolites and intermediates of the tricarboxylic acid (TCA) cycle are shown below.

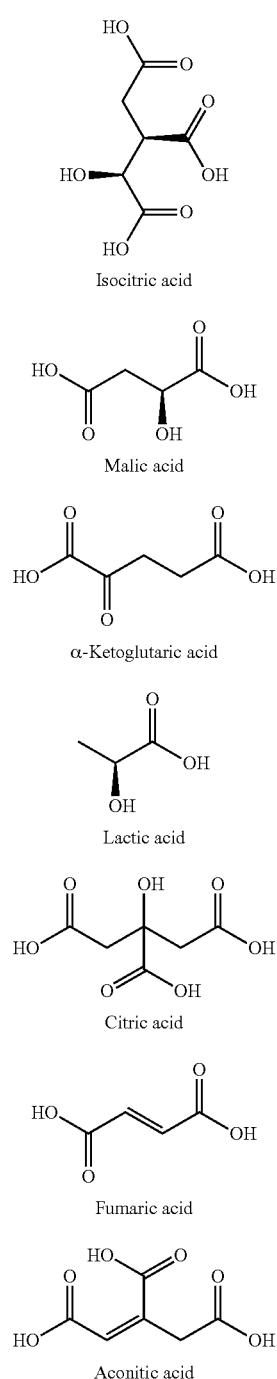

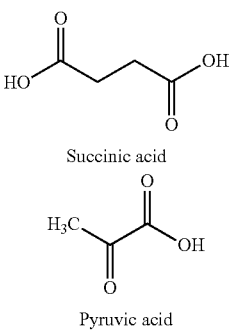

Samples were injected onto an LC/MS system in neat solution and spiked into human plasma treated with dipotassium ethylenediaminotetraacetic acid (K2EDTA). These analytes were then separated using an ACQUITY® UPLC® I-Class LC system (commercially available from Waters Technologies Corporation, Milford, Mass. USA) coupled with a Xevo® TQ S tandem quadrupole mass spectrometer operated in ESI negative mode and in MRM acquisition mode (commercially available from Waters Technologies Corporation, Milford, Mass. USA). Details of the method are described in Tables 2 and 3.

TABLE 2

Liquid Chromatography Conditions

| | |
|---|---|
| Columns | ACQUITY ® UPLC ® CSH $C_{18}$ column; 130 Å 1.7 µm 2.1 × 100 mm |
| | ACQUITY ® UPLC ® CSH Phenyl-Hexyl column; 130 Å 1.7 µm 2.1 × 100 mm |
| | ACQUITY ® UPLC ® CSH Fluoro-Phenyl column; 130 Å 1.7 µm 2.1 × 100 mm |
| | (commercially available from Waters Technologies Corporation, Milford, MA USA) |
| Mobile Phase A | 100% water, 0.1% formic acid (v/v) |
| Mobile Phase B | 100% acetonitrile, 0.1% formic acid (v/v) |
| Column Temperature | 50° C. |
| Injection Volume | 3 µL |
| Sample Diluent | Water |
| Detection | Tandem quadrupole MS MRM mode ESI negative mode |

TABLE 3

Gradient Table

| Time (min) | Flow Rate (mL/min) | % A | % B | Curve |
|---|---|---|---|---|
| Initial | 0.40 | 100.0 | 0.00 | Initial |
| 3.00 | 0.40 | 70 | 30.0 | 6 |
| 3.50 | 0.40 | 5.0 | 95.0 | 6 |
| 6.50 | 0.40 | 5.0 | 95.0 | 6 |
| 7.00 | 0.40 | 100.0 | 0.0 | 6 |

Figure 3A:
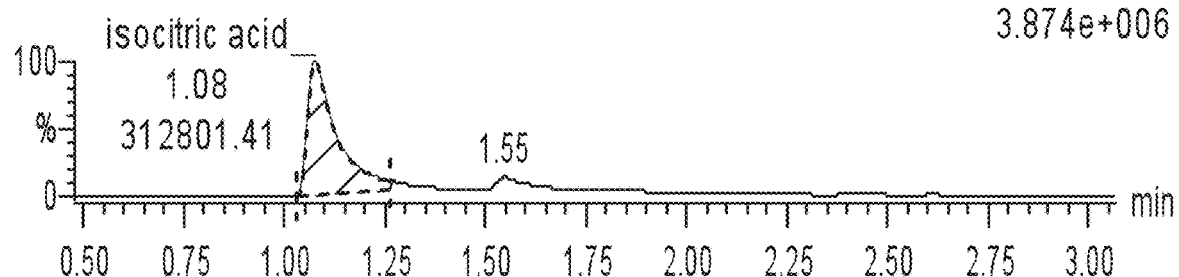
FIG. 3A is an MRM chromatogram for the separation of isocitric acid, a TCA cycle analyte, on CSH $C_{18}$ 100 µM STD, according to an illustrative embodiment of the technology.
Figure 3B:
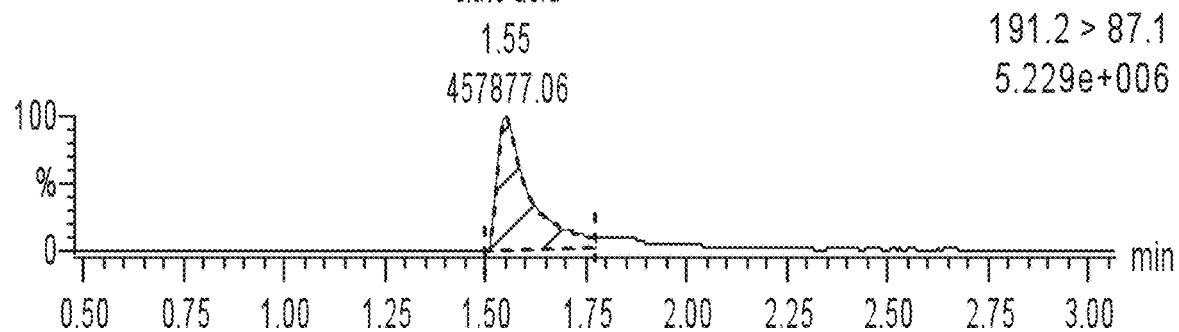
FIG. 3B is an MRM chromatogram for the separation of citric acid, a TCA cycle analyte, on CSH $C_{18}$ 100 µM STD, according to an illustrative embodiment of the technology.
Figure 3C:
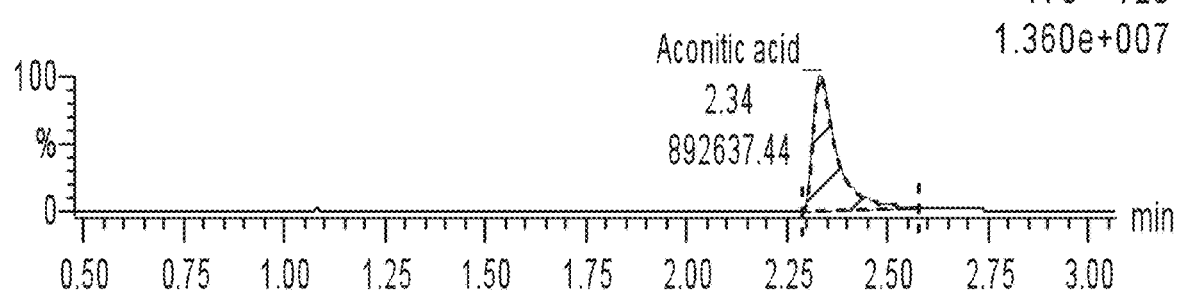
FIG. 3C is an MRM chromatogram for the separation of aconitic acid, a TCA cycle analyte, on CSH $C_{18}$ 100 µM STD, according to an illustrative embodiment of the technology.
Figure 3D:
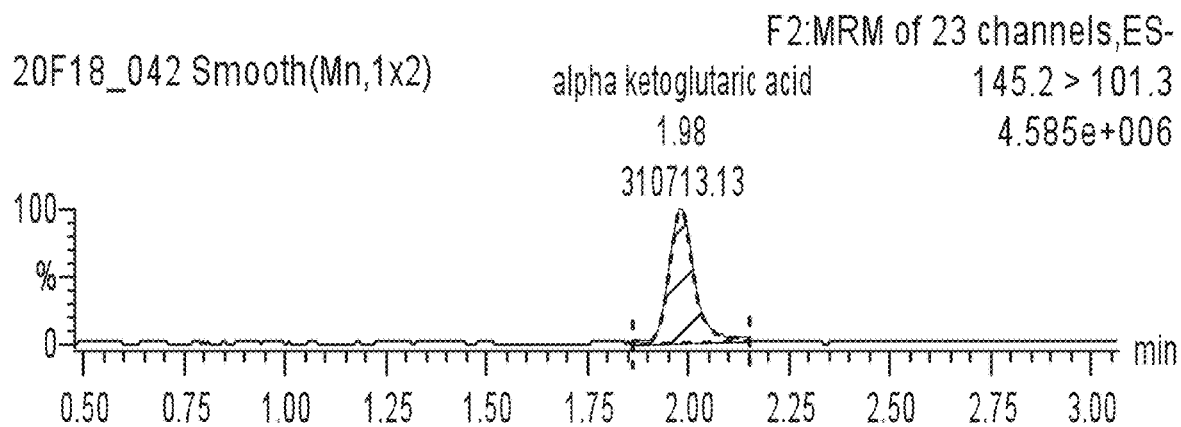
FIG. 3D is an MRM chromatogram for the separation of alpha ketoglutaric acid, a TCA cycle analyte, on CSH $C_{18}$ 100 µM STD, according to an illustrative embodiment of the technology.
Figure 3E:
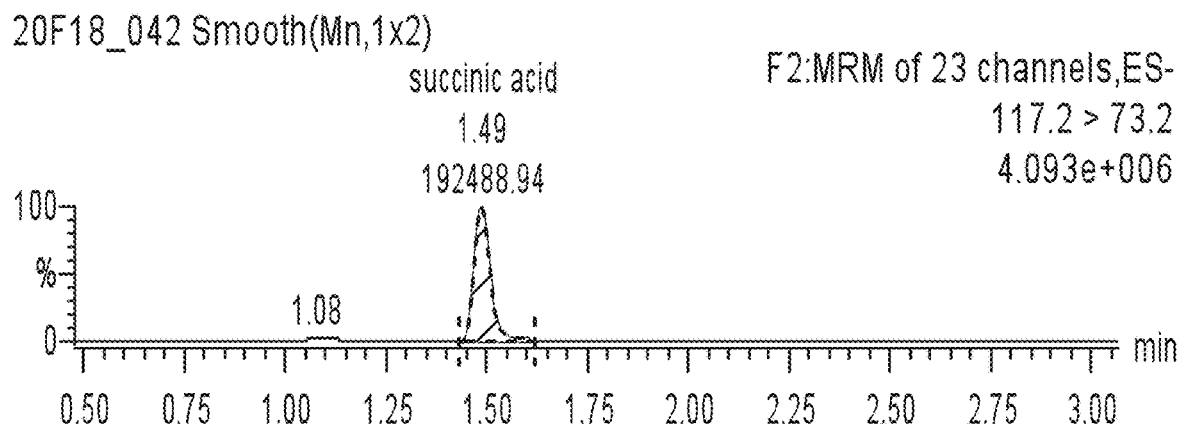
FIG. 3E is an MRM chromatogram for the separation of succinic acid, a TCA cycle analyte, on CSH $C_{18}$ 100 µM STD, according to an illustrative embodiment of the technology.
Figure 3F:
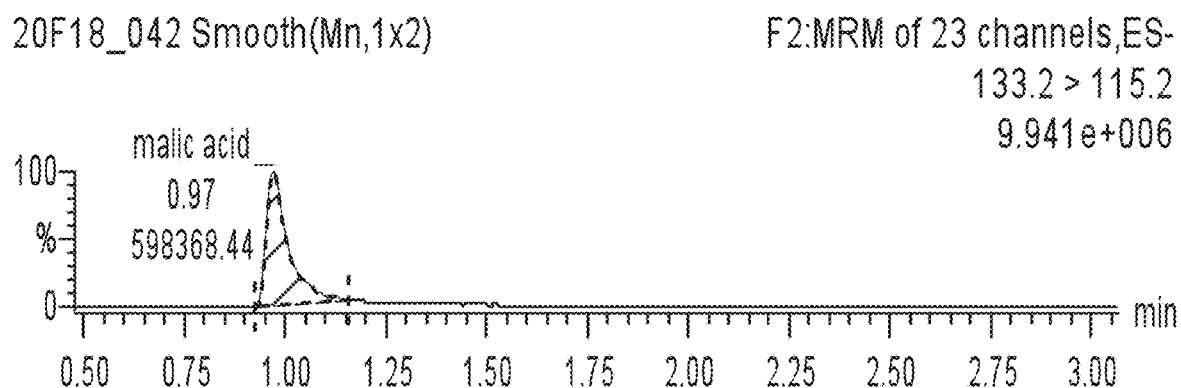
FIG. 3F is an MRM chromatogram for the separation of malic acid, a TCA cycle analyte, on CSH $C_{18}$ 100 µM STD, according to an illustrative embodiment of the technology.
Figure 3G:
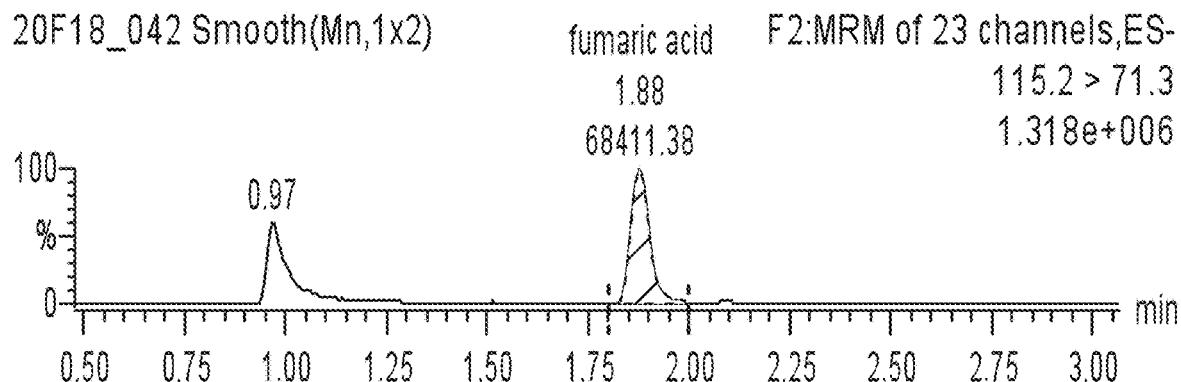
FIG. 3G is an MRM chromatogram for the separation of fumaric acid, a TCA cycle analyte, on CSH $C_{18}$ 100 µM STD, according to an illustrative embodiment of the technology.
Figure 3H:
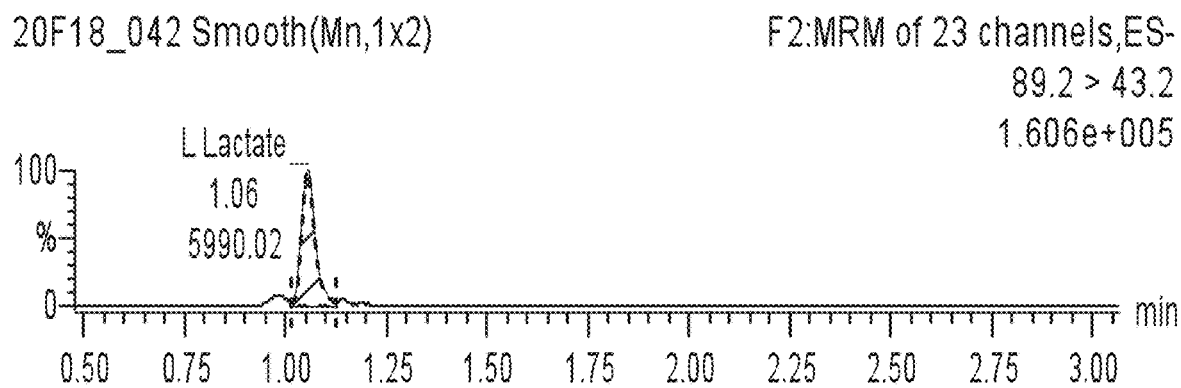
FIG. 3H is an MRM chromatogram for the separation of lactic acid, a TCA cycle analyte, on CSH $C_{18}$ 100 µM STD, according to an illustrative embodiment of the technology.
Figure 3I:
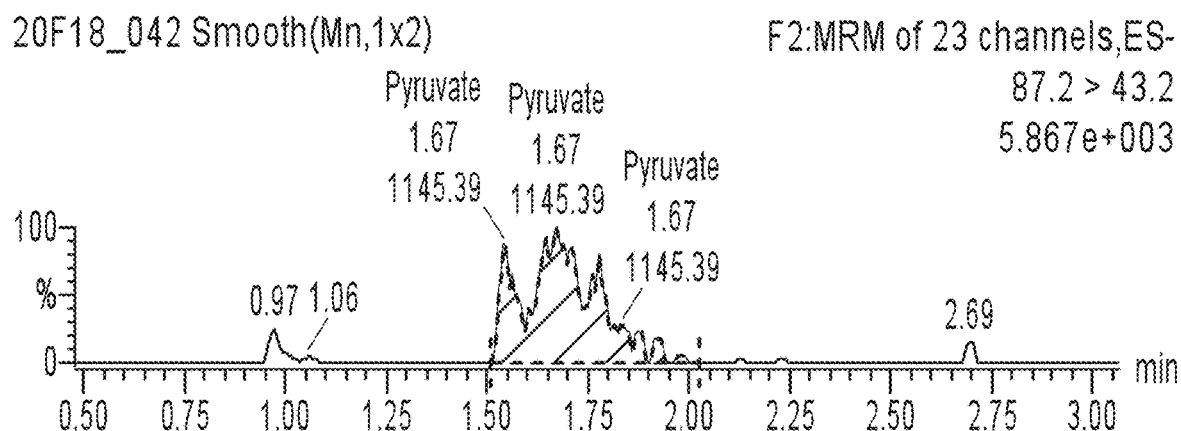
FIG. 3I is an MRM chromatogram for the separation of pyruvate acid, a TCA cycle analyte, on CSH $C_{18}$ 100 µM STD, according to an illustrative embodiment of the technology.

FIGS. 3A-3I present MRM chromatograms of various TCA cycle metabolites and intermediates and the effectiveness of a mixed mode separations using a CSH $C_{18}$ column at 100 µM STD. FIG. 3A shows the MRM chromatogram for isocitric acid. FIG. 3B shows the MRM chromatogram for citric acid. FIG. 3C shows the MRM chromatogram for aconitic acid. FIG. 3D shows the MRM chromatogram for alpha ketoglutaric acid. FIG. 3E shows the MRM chromatogram for succinic acid. FIG. 3F shows the MRM chromatogram for malic acid. FIG. 3G shows the MRM chromatogram for fumaric acid. FIG. 3H shows the MRM chromatogram for lactic acid. FIG. 3I shows the MRM chromatogram for pyruvate acid.

Figure 4A:
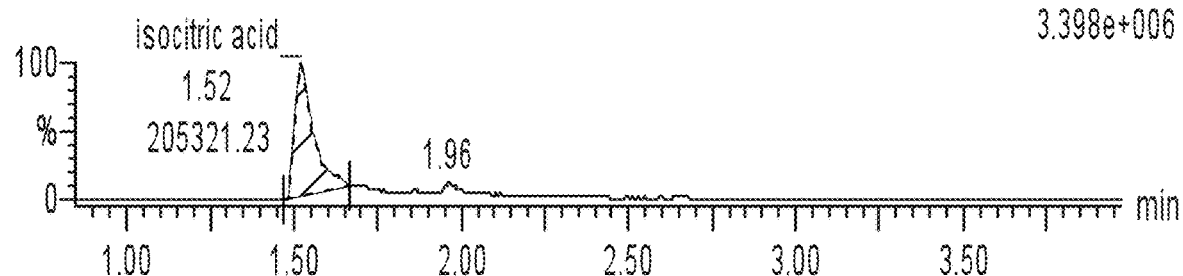
FIG. 4A is an MRM chromatogram for the separation of isocitric acid, a TCA cycle analyte, on CSH phenyl hexyl 100 µM STD, according to an illustrative embodiment of the technology.
Figure 4B:
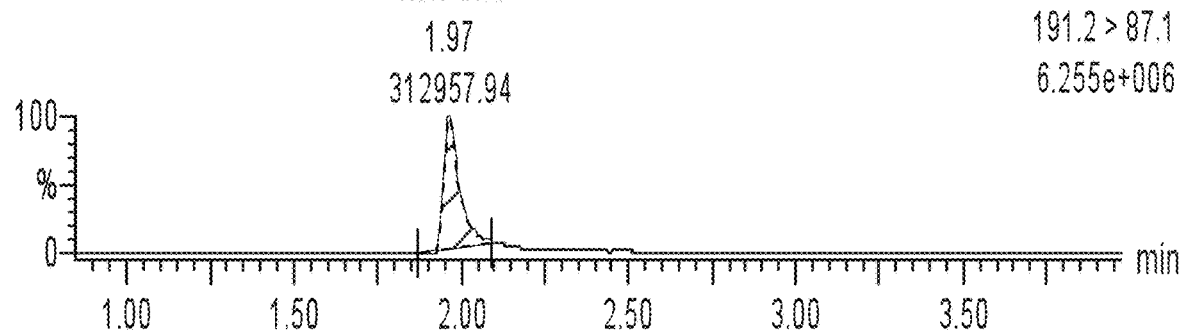
FIG. 4B is an MRM chromatogram for the separation of citric acid, a TCA cycle analyte, on CSH phenyl hexyl 100 µM STD, according to an illustrative embodiment of the technology.
Figure 4C:
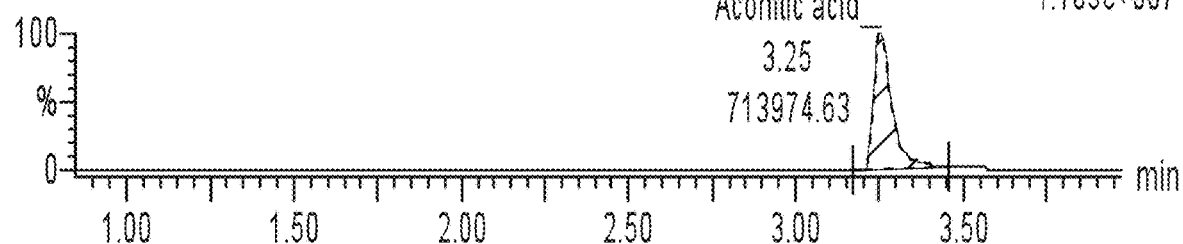
FIG. 4C is an MRM chromatogram for the separation of aconitic acid, a TCA cycle analyte, on CSH phenyl hexyl 100 µM STD, according to an illustrative embodiment of the technology.
Figure 4D:
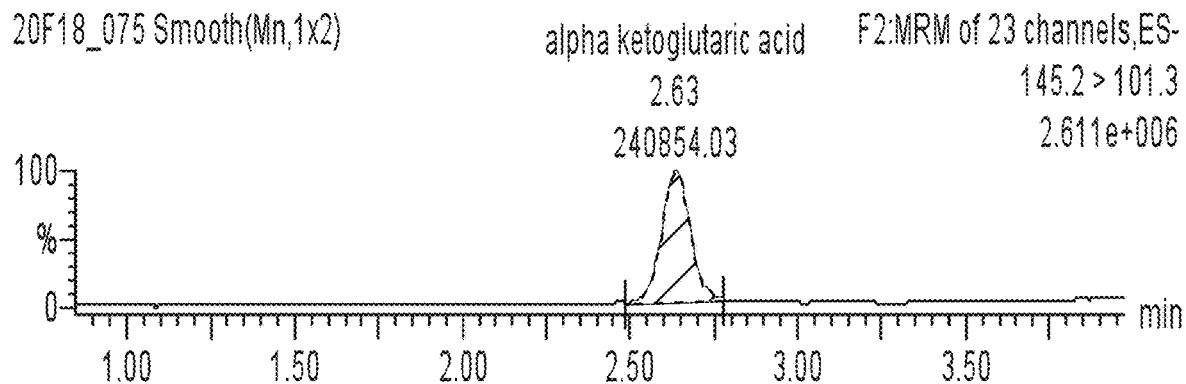
FIG. 4D is an MRM chromatogram for the separation of alpha ketoglutaric acid, a TCA cycle analyte, on CSH phenyl hexyl 100 µM STD, according to an illustrative embodiment of the technology.
Figure 4E:
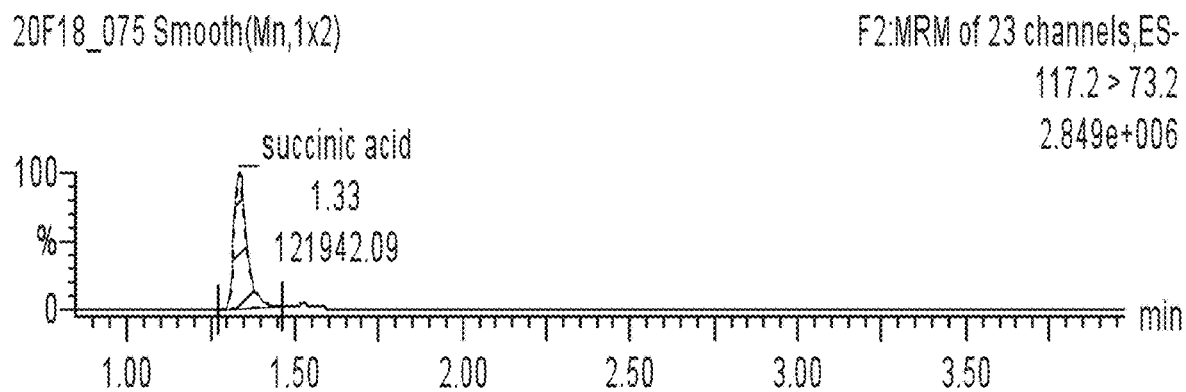
FIG. 4E is an MRM chromatogram for the separation of succinic acid, a TCA cycle analyte, on CSH phenyl hexyl 100 µM STD, according to an illustrative embodiment of the technology.
Figure 4F:
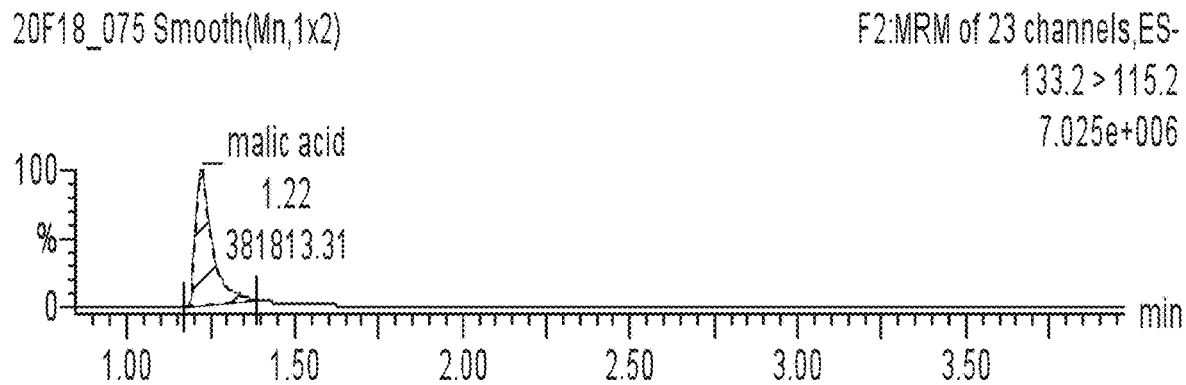
FIG. 4F is an MRM chromatogram for the separation of malic acid, a TCA cycle analyte, on CSH phenyl hexyl 100 µM STD, according to an illustrative embodiment of the technology.
Figure 4G:
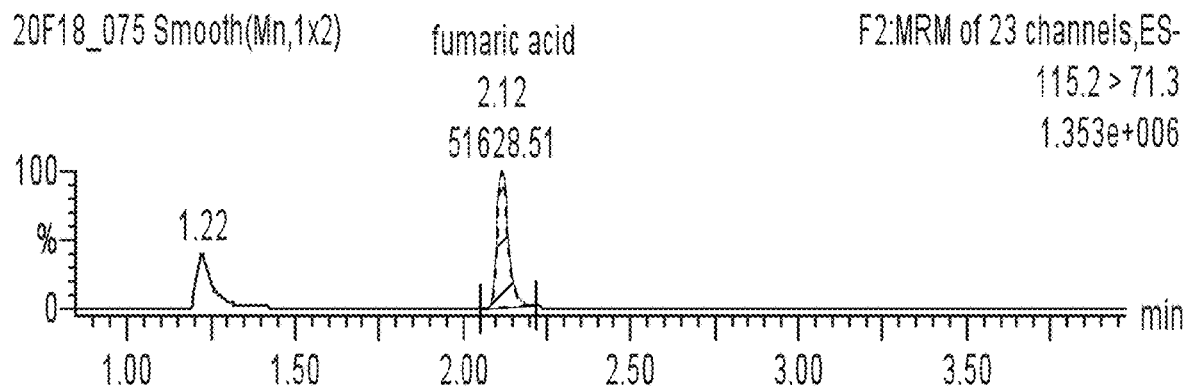
FIG. 4G is an MRM chromatogram for the separation of fumaric acid, a TCA cycle analyte, on CSH phenyl hexyl 100 µM STD, according to an illustrative embodiment of the technology.
Figure 4H:
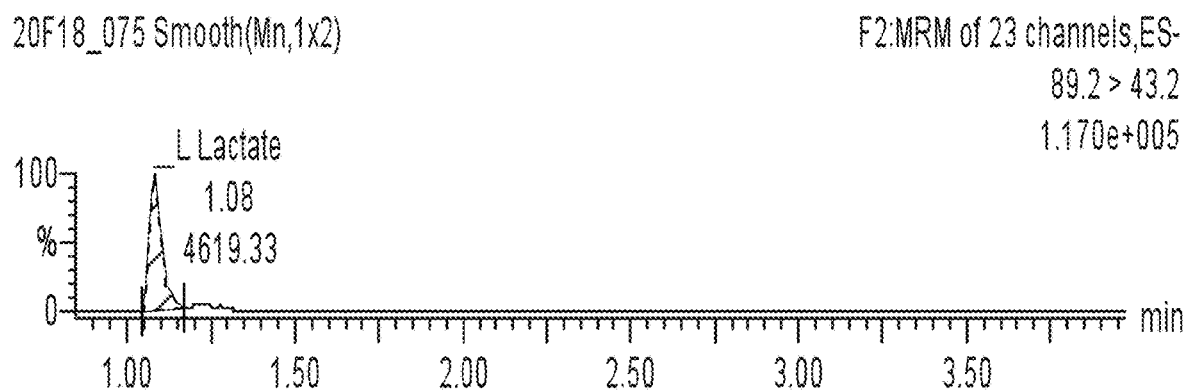
FIG. 4H is an MRM chromatogram for the separation of lactic acid, a TCA cycle analyte, on CSH phenyl hexyl 100 µM STD, according to an illustrative embodiment of the technology.
Figure 4I:
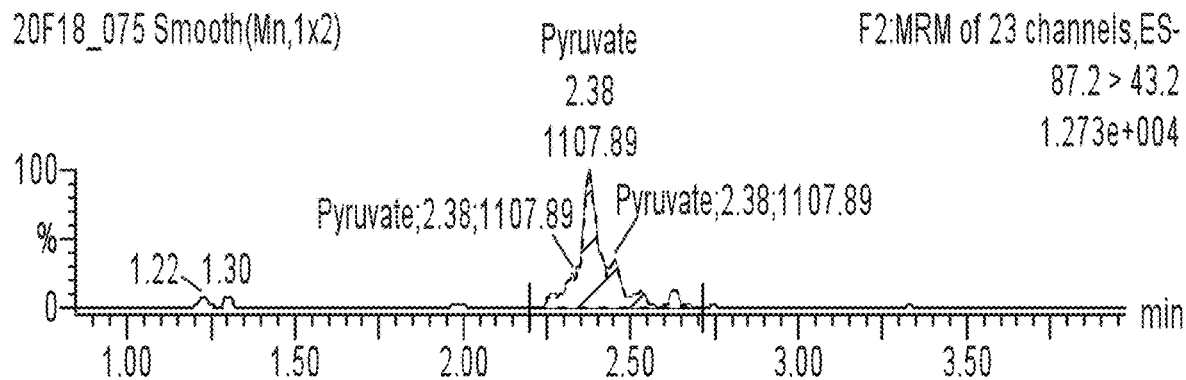
FIG. 4I is an MRM chromatogram for the separation of pyruvate acid, a TCA cycle analyte, on CSH phenyl hexyl 100 µM STD, according to an illustrative embodiment of the technology.

FIGS. 4A-4I present MRM chromatograms of various TCA cycle metabolites and intermediates and the effectiveness of a mixed mode separations using a CSH phenyl hexyl column at 100 µM STD. FIG. 4A shows the MRM chromatogram for isocitric acid. FIG. 4B shows the MRM chromatogram for citric acid. FIG. 4C shows the MRM chromatogram for aconitic acid. FIG. 4D shows the MRM chromatogram for alpha ketoglutaric acid. FIG. 4E shows the MRM chromatogram for succinic acid. FIG. 4F shows the MRM chromatogram for malic acid. FIG. 4G shows the MRM chromatogram for fumaric acid. FIG. 4H shows the MRM chromatogram for lactic acid. FIG. 4I shows the MRM chromatogram for pyruvate acid.

Figure 5A:
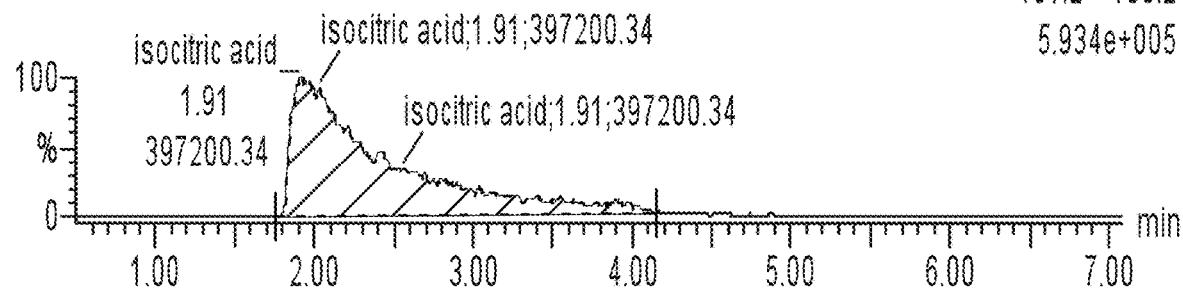
FIG. 5A is an MRM chromatogram for the separation of isocitric acid, a TCA cycle analyte, on CSH phenyl hexyl 100 µM STD, according to an illustrative embodiment of the technology.
Figure 5B:
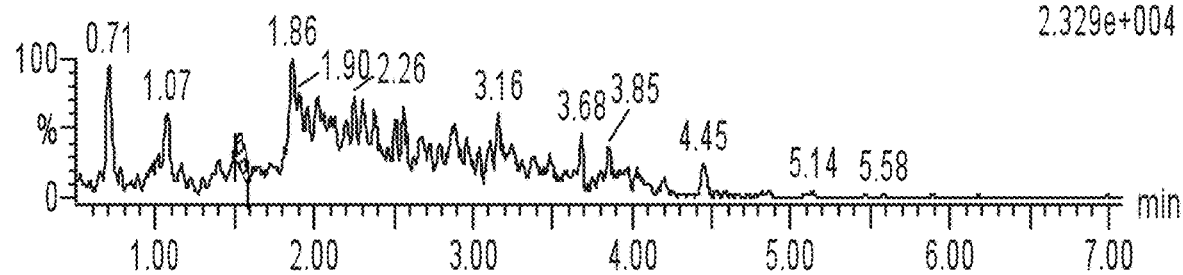
FIG. 5B is an MRM chromatogram for the separation of citric acid, a TCA cycle analyte, on CSH fluoro phenyl 100 µM STD, according to an illustrative embodiment of the technology.
Figure 5C:
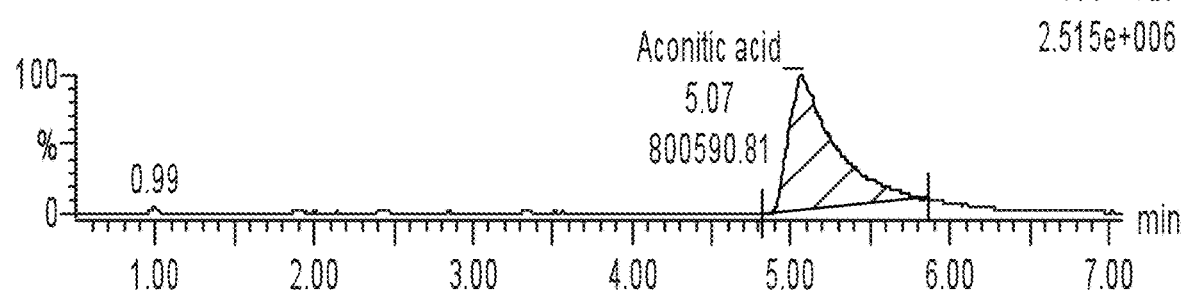
FIG. 5C is an MRM chromatogram for the separation of aconitic acid, a TCA cycle analyte, on CSH fluoro phenyl 100 µM STD, according to an illustrative embodiment of the technology.
Figure 5D:
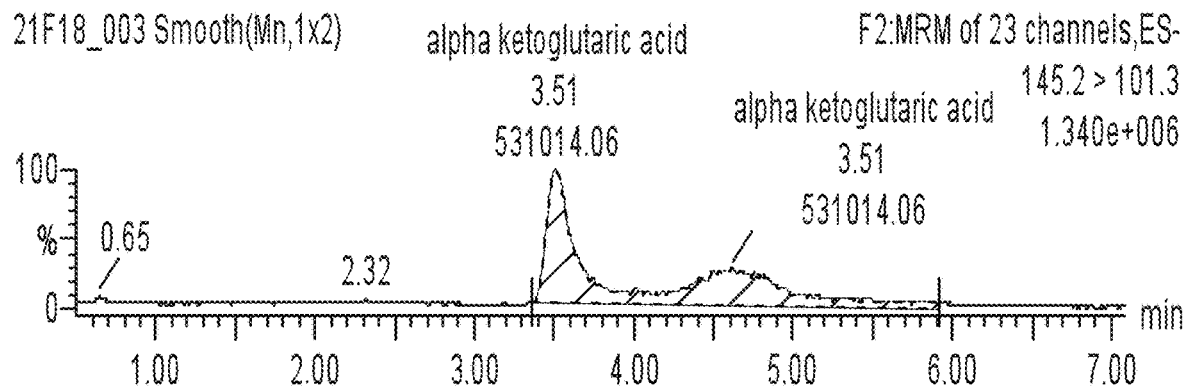
FIG. 5D is an MRM chromatogram for the separation of alpha ketoglutaric acid, a TCA cycle analyte, on CSH fluoro phenyl 100 µM STD, according to an illustrative embodiment of the technology.
Figure 5E:
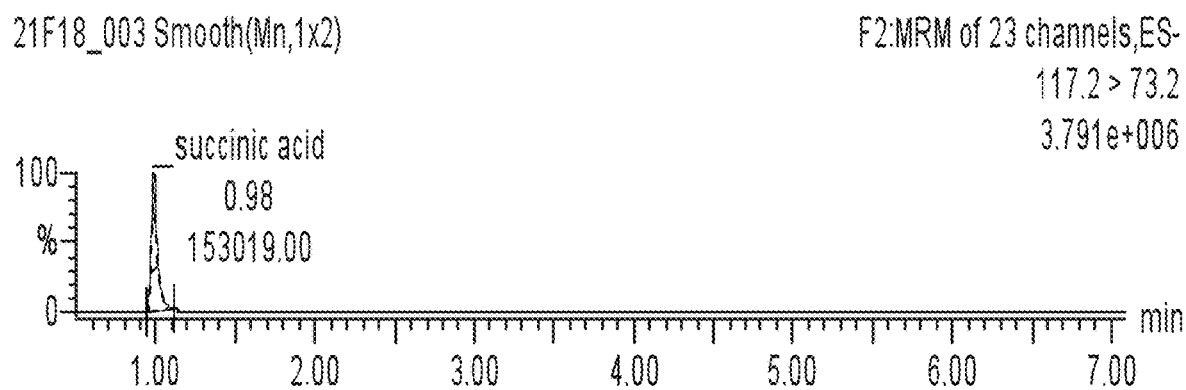
FIG. 5E is an MRM chromatogram for the separation of succinic acid, a TCA cycle analyte, on CSH fluoro phenyl 100 µM STD, according to an illustrative embodiment of the technology.
Figure 5F:
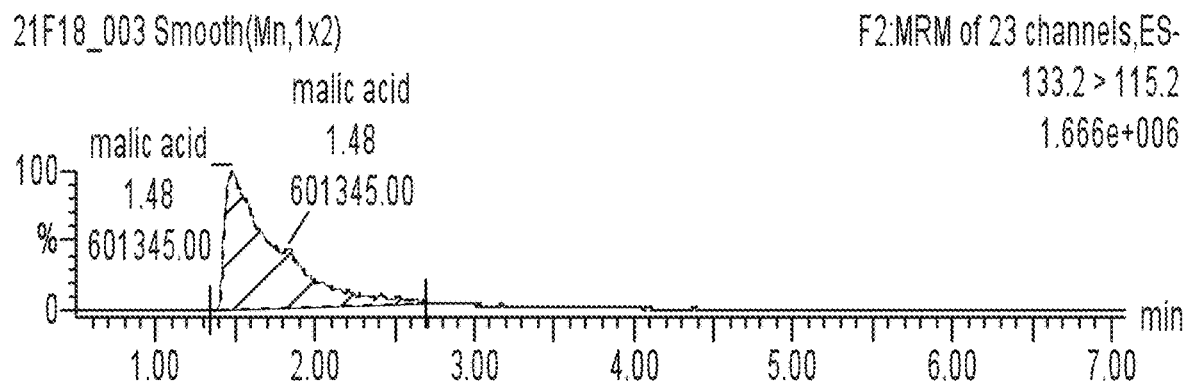
FIG. 5F is an MRM chromatogram for the separation of malic acid, a TCA cycle analyte, on CSH fluoro phenyl 100 µM STD, according to an illustrative embodiment of the technology.
Figure 5G:
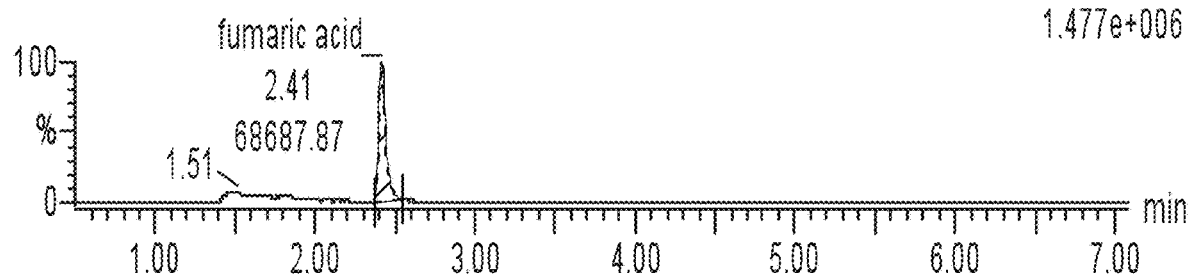
FIG. 5G is an MRM chromatogram for the separation of fumaric acid, a TCA cycle analyte, on CSH fluoro phenyl 100 µM STD, according to an illustrative embodiment of the technology.
Figure 5H:
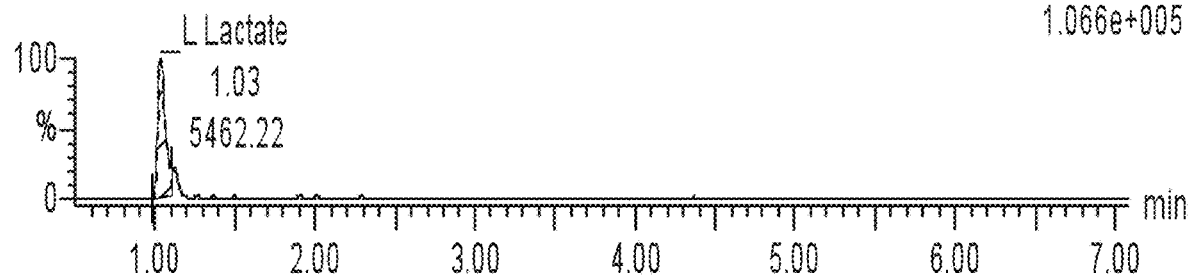
FIG. 5H is an MRM chromatogram for the separation of lactic acid, a TCA cycle analyte, on CSH fluoro phenyl 100 µM STD, according to an illustrative embodiment of the technology.
Figure 5I:
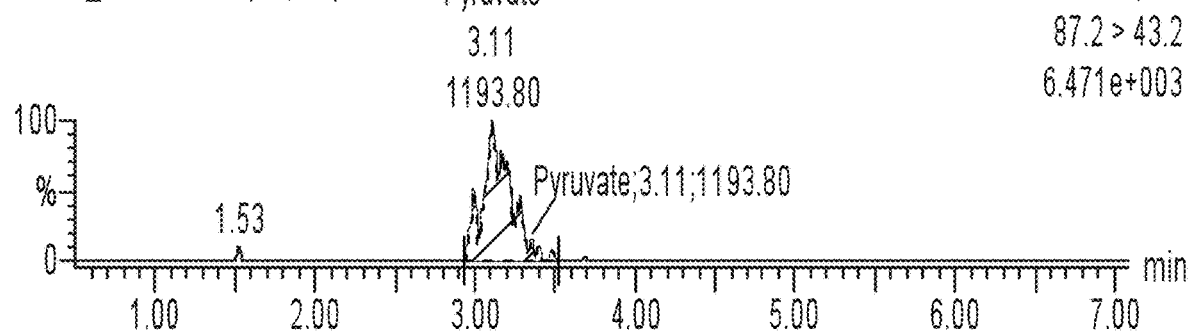
FIG. 5I is an MRM chromatogram for the separation of pyruvate acid, a TCA cycle analyte, on CSH fluoro phenyl 100 µM STD, according to an illustrative embodiment of the technology.

FIGS. 5A-5I present MRM chromatograms of various TCA cycle metabolites and intermediates and the effectiveness of a mixed mode separations using a CSH fluoro phenyl column at 100 µM STD. FIG. 5A shows the MRM chromatogram for isocitric acid. FIG. 5B shows the MRM chromatogram for citric acid. FIG. 5C shows the MRM chromatogram for aconitic acid. FIG. 5D shows the MRM chromatogram for alpha ketoglutaric acid. FIG. 5E shows the MRM chromatogram for succinic acid. FIG. 5F shows the MRM chromatogram for malic acid. FIG. 5G shows the MRM chromatogram for fumaric acid. FIG. 5H shows the MRM chromatogram for lactic acid. FIG. 5I shows the MRM chromatogram for pyruvate acid.

The metabolites in the TCA cycle are highly polar, most containing two or three carboxylic acid groups (see structures above). The $pK_a$ values of the most acidic groups in these molecules range from approximately 2.8 to 3.8. They are poorly retained on conventional reversed-phase columns. It was determined that these compounds were retained on the three CSH materials, using a mobile phase containing 0.1% formic acid in water and in acetonitrile. As shown by comparing FIGS. 3A-I, 4A-I and 5A-I, the most promising results were obtained using the CSH phenyl hexyl column. While the CSH fluoro-phenyl column showed greater retention of these analytes, several exhibited poor peak shapes under these conditions.

Figure 6A:
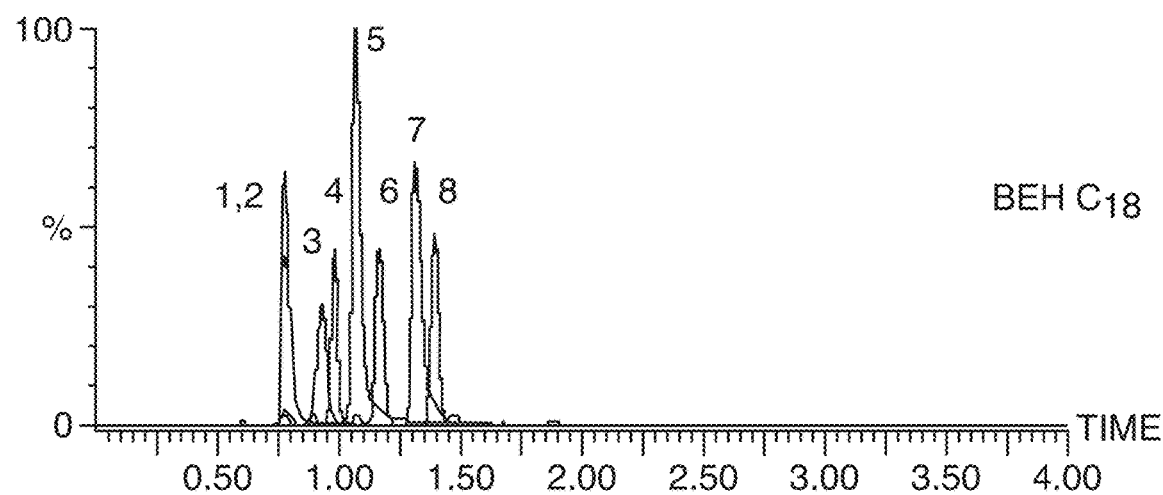
FIG. 6A is a chromatogram for the separation of TCA cycle metabolites using a BEH $C_{18}$ column, according to an illustrative embodiment of the technology.
Figure 6B:
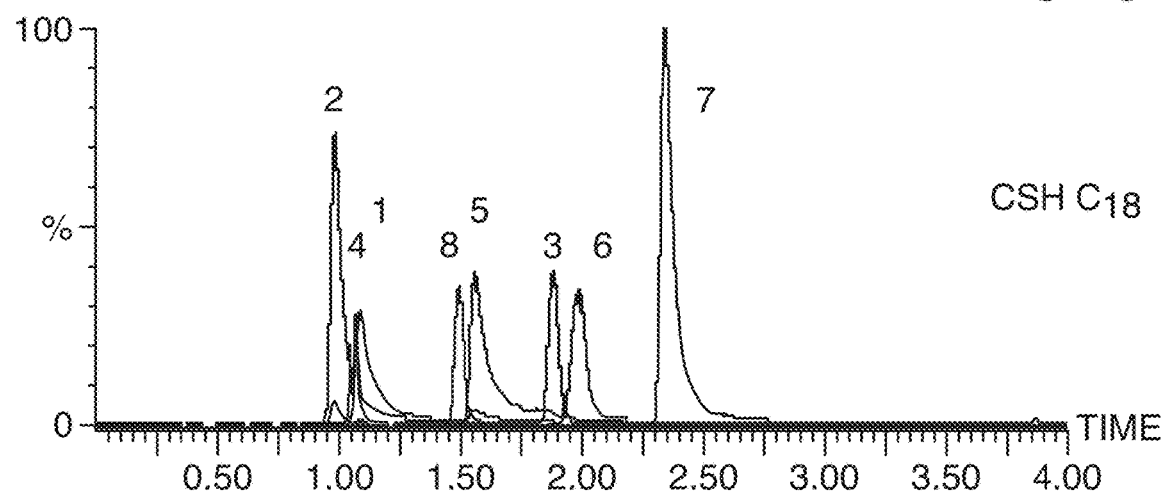
FIG. 6B is a chromatogram for the separation of TCA cycle metabolites using a CSH $C_{18}$ column, according to an illustrative embodiment of the technology.
Figure 6C:
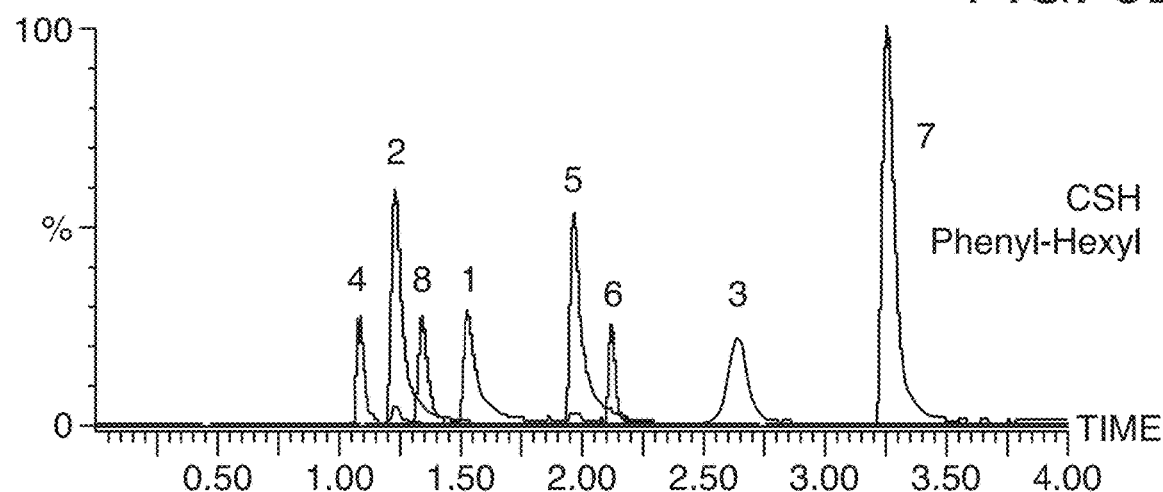
FIG. 6C is a chromatogram for the separation of TCA cycle metabolites using a CSH phenyl-hexyl column, according to an illustrative embodiment of the technology.

FIGS. 6A-C show chromatograms of the separation of TCA cycle metabolites using a BEH $C_{18}$ column (FIG. 6A), a CSH $C_{18}$ column (FIG. 6B) and a CSH phenyl-hexyl column (FIG. 6C). The columns were all 1.7 am 2.1×100 mm columns. In each of these figures, 1 is isocitric acid, 2 is malic acid, 3 is alpha-ketoglutaric acid, 4 is lactic acid, 5 is citric acid, 6 is fumaric acid, 7 is aconitric acid, and 8 is succinic acid.

The CSH columns have significant retention for anions when the mobile pH is less than 5, with retention increasing as the pH is decreased. The relative retention of anions increases from CSH $C_{18}$<CSH phenyl-hexyl<CSH fluoro-phenyl. The ability to retain anions makes CSH columns useful for the separation of polar acids such as the TCA cycle metabolites.

Example 2: Amino Acids

Standards were prepared in water and diluted with water to make a solution of 100 µMolar for glutamine and glutamate and 10 µg/mL for leucine and isoleucine. These analytes were then separated using an ACQUITY® UPLC® I-Class LC system (commercially available from Waters Technologies Corporation, Milford, Mass. USA) coupled with a Xevo® TQ S tandem quadrupole mass spectrometer operated in ESI negative mode and in MRM acquisition mode (commercially available from Waters Technologies Corporation, Milford, Mass. USA). Details of the method are described in Tables 4 and 5.

TABLE 4

| Liquid Chromatography Conditions | |
|---|---|
| Columns | ACQUITY ® UPLC ® CSH $C_{18}$ column; 130 Å 1.7 µm 2.1 × 100 mm ACQUITY ® UPLC ® CSH Phenyl-Hexyl column; 130 Å 1.7 µm 2.1 × 100 mm ACQUITY ® UPLC ® CSH Fluoro-Phenyl column; 130 Å 1.7 µm 2.1 × 100 mm (commercially available from Waters Technologies Corporation, Milford, MA USA) |
| Mobile Phase A | 100% water, 0.1% formic acid (v/v) |
| Mobile Phase B | 100% acetonitrile, 0.1% formic acid (v/v) |
| Column Temperature | 50° C. |
| Injection Volume | 3 µL |
| Sample Diluent | Water |
| Detection | Tandem quadrupole MS MRM mode ESI negative mode |

TABLE 5

| Gradient Table | | | | |
|---|---|---|---|---|
| Time (min) | Flow Rate (mL/min) | % A | % B | Curve |
| Initial | 0.40 | 100.0 | 0.00 | Initial |
| 3.00 | 0.40 | 70 | 30.0 | 6 |
| 3.50 | 0.40 | 5.0 | 95.0 | 6 |
| 6.50 | 0.40 | 5.0 | 95.0 | 6 |
| 7.00 | 0.40 | 100.0 | 0.0 | 6 |

Figure 7A:
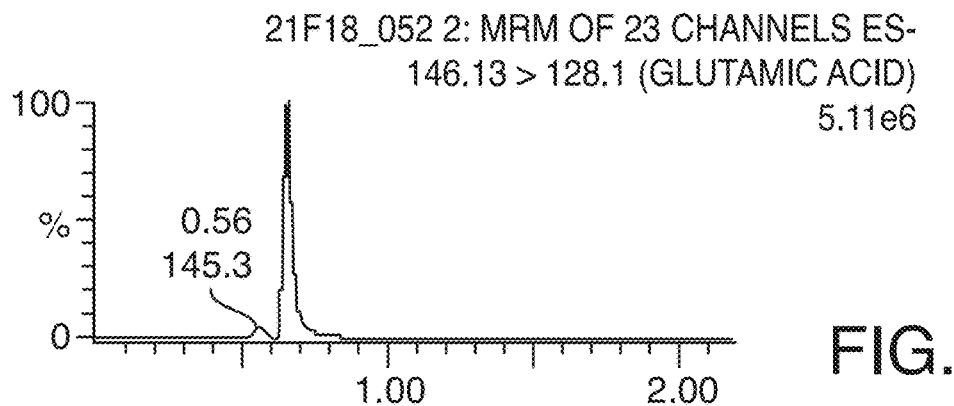
FIG. 7A is a chromatogram for the separation of glutamate acid using a CSH $C_{18}$ STD column, according to an illustrative embodiment of the technology.
Figure 7B:
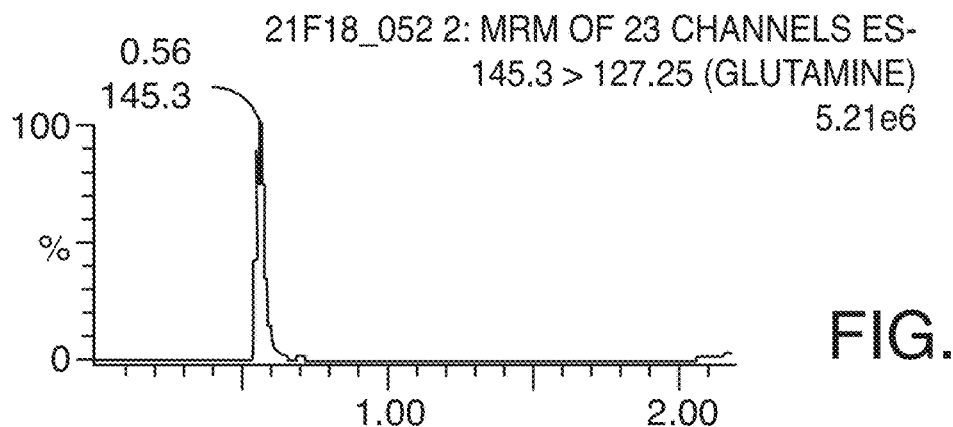
FIG. 7B is a chromatogram for the separation of glutamine acid using a CSH $C_{18}$ STD column, according to an illustrative embodiment of the technology.
Figure 7C:
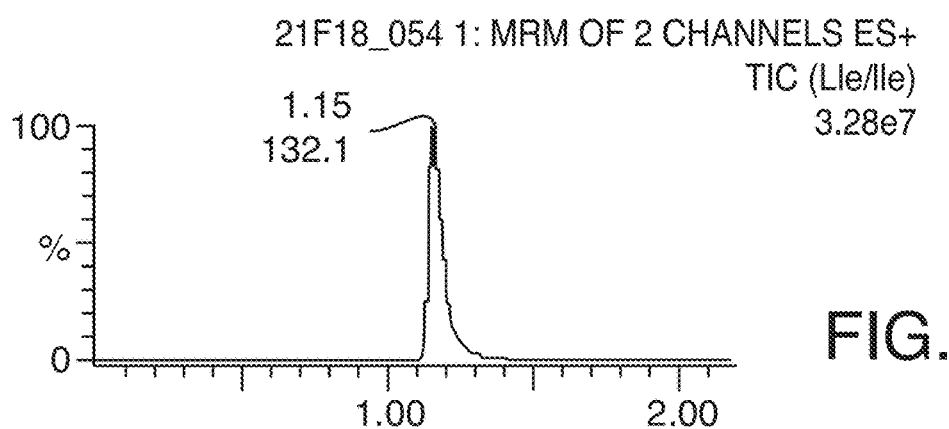
FIG. 7C is a chromatogram for the separation of isoleucine acid using a CSH $C_{18}$ STD column, according to an illustrative embodiment of the technology.
Figure 7D:
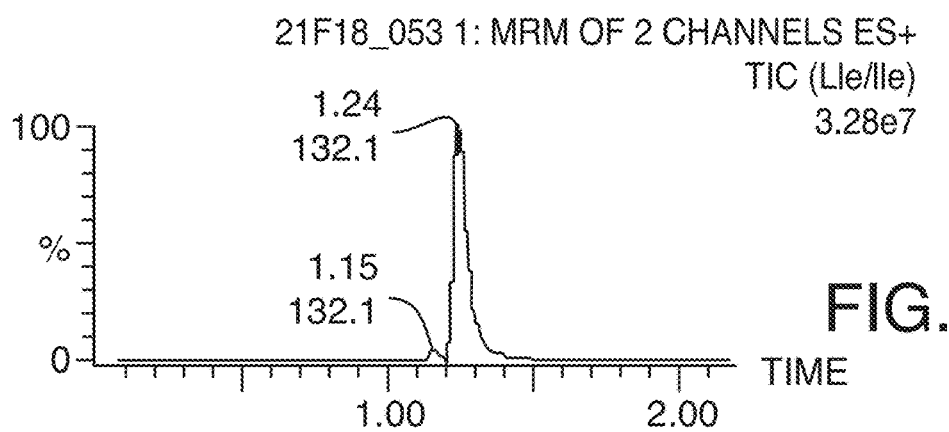
FIG. 7D is a chromatogram for the separation of leucine acid using a CSH $C_{18}$ STD column, according to an illustrative embodiment of the technology.

FIGS. 7A-7D show the analysis of amino acids using a CSH $C_{18}$ STD sorbent in a reversed phase column. FIG. 7A shows the MRM chromatogram for glutamic acid. FIG. 7B shows the MRM chromatogram for glutimine acid. FIG. 7C shows the MRM chromatogram for isoleucine acid. FIG. 7D shows the MRM chromatogram for leucine acid.

Figure 8A:
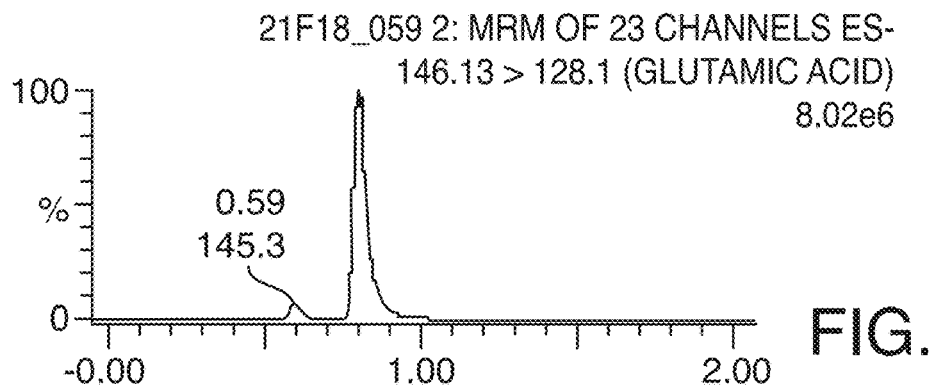
FIG. 8A is a chromatogram for the separation of glutamate acid using a CSH phenyl hexyl STD column, according to an illustrative embodiment of the technology.
Figure 8B:
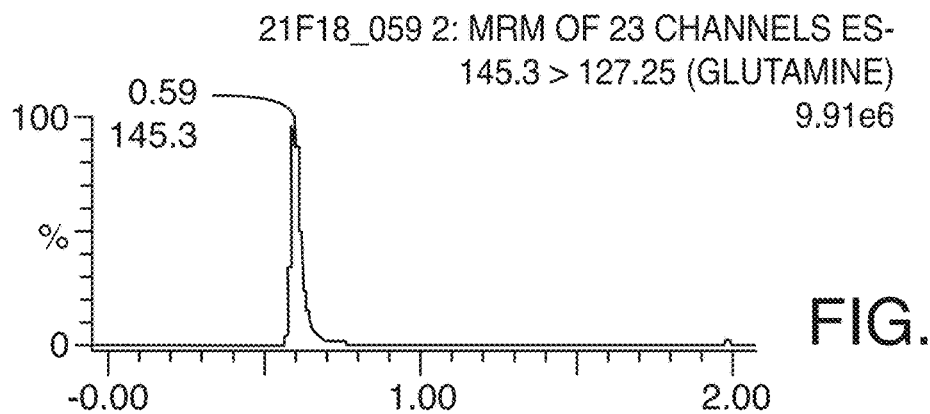
FIG. 8B is a chromatogram for the separation of glutamine acid using a CSH phenyl hexyl STD column, according to an illustrative embodiment of the technology.
Figure 8C:
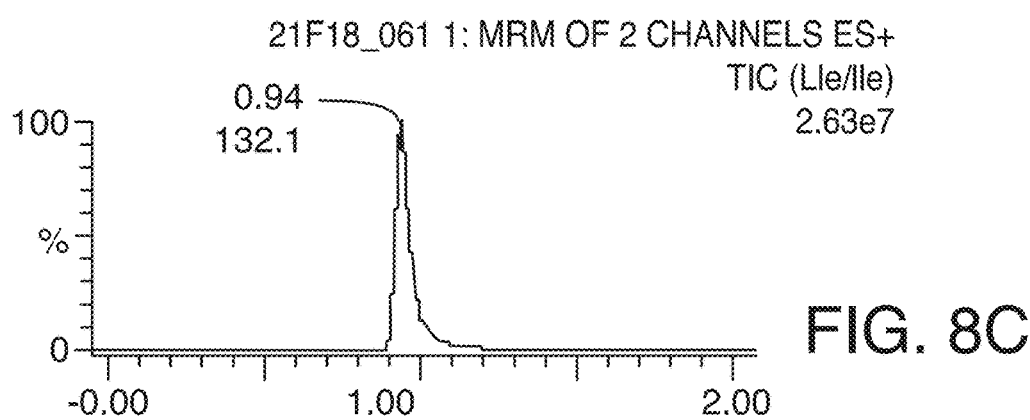
FIG. 8C is a chromatogram for the separation of isoleucine acid using a CSH phenyl hexyl STD column, according to an illustrative embodiment of the technology.
Figure 8D:
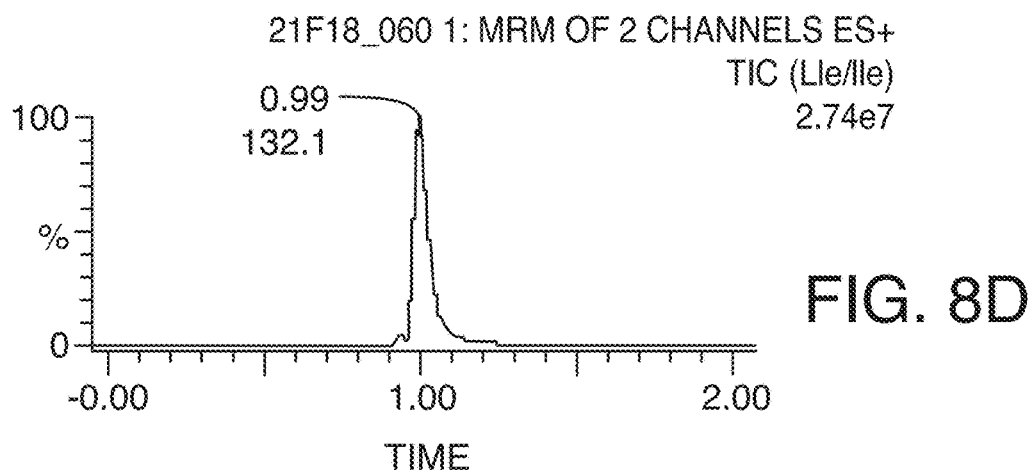
FIG. 8D is a chromatogram for the separation of leucine acid using a CSH phenyl hexyl STD column, according to an illustrative embodiment of the technology.

FIGS. 8A-8D show the analysis of amino acids using a CSH phenyl hexyl STD sorbent in a reversed phase column. FIG. 8A shows the MRM chromatogram for glutamic acid. FIG. 8B shows the MRM chromatogram for glutimine acid. FIG. 8C shows the MRM chromatogram for isoleucine acid. FIG. 8D shows the MRM chromatogram for leucine acid.

Figure 9A:
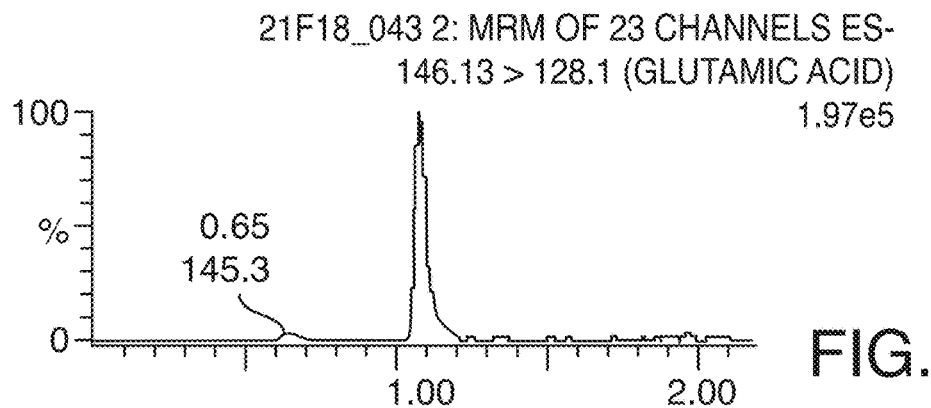
FIG. 9A is a chromatogram for the separation of glutamate acid using a CSH fluoro phenyl STD column, according to an illustrative embodiment of the technology.
Figure 9B:
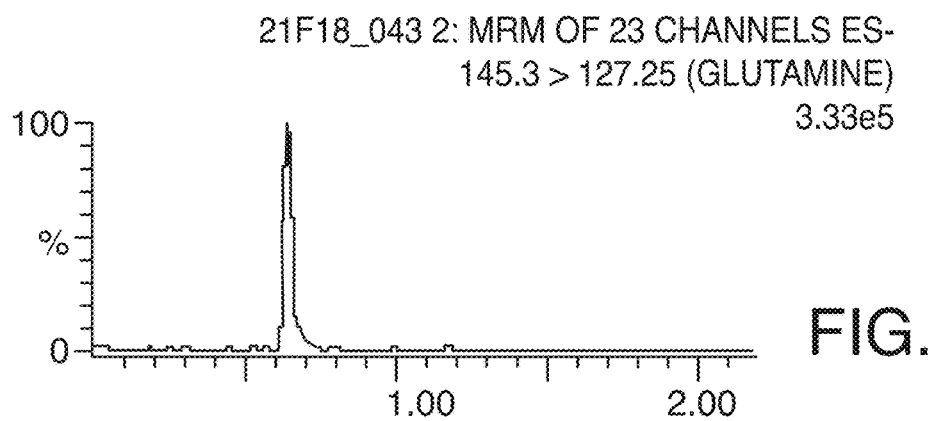
FIG. 9B is a chromatogram for the separation of glutamine acid using a CSH fluoro phenyl STD column, according to an illustrative embodiment of the technology.
Figure 9C:
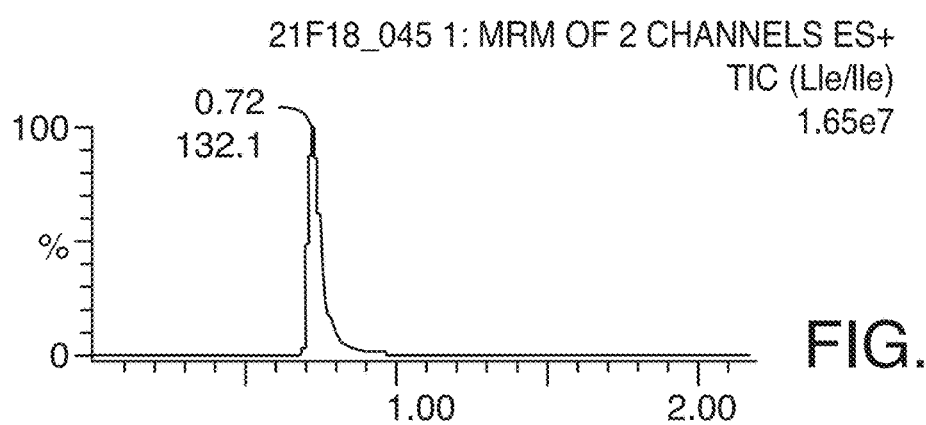
FIG. 9C is a chromatogram for the separation of isoleucine acid using a CSH fluoro phenyl STD column, according to an illustrative embodiment of the technology.
Figure 9D:
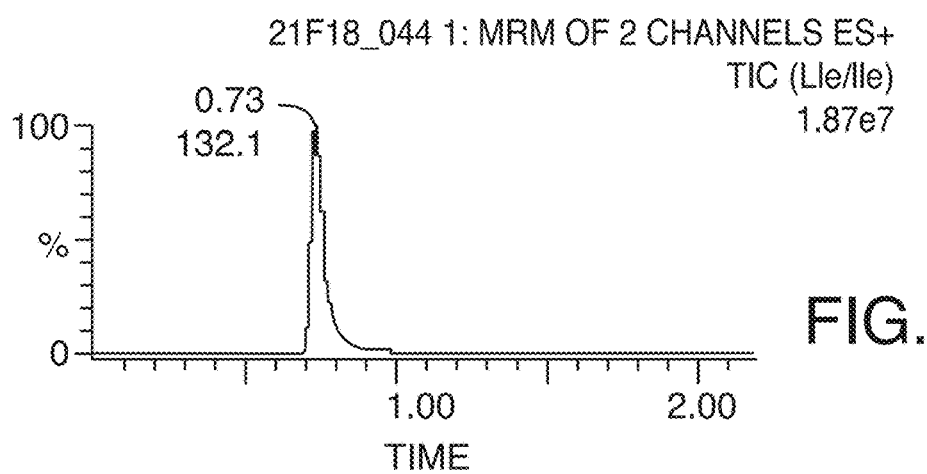
FIG. 9D is a chromatogram for the separation of leucine acid using a CSH fluoro phenyl STD column, according to an illustrative embodiment of the technology.

FIGS. 9A-9D show the analysis of amino acids using a CSH fluoro phenyl STD sorbent in a reversed phase column. FIG. 9A shows the MRM chromatogram for glutamic acid. FIG. 9B shows the MRM chromatogram for glutimine acid. FIG. 9C shows the MRM chromatogram for isoleucine acid. FIG. 9D shows the MRM chromatogram for leucine acid.

As can be seen from a comparison of FIGS. 7-9, the CSH phenyl hexyl column showed increased separation and retention for glutamate and glutamine compared to the CSH $C_{18}$ column. Moreover, the CSH fluoro phenyl column showed increased separation and retention for glutamate and glutamine compared to both the CSH CSH $C_{18}$ column and the CSH phenyl hexyl column.

In contrast, the opposite result can be seen for isoleucine and leucine where the CSH phenyl hexyl column showed decreased separation and retention for glutamate and glutamine compared to the CSH $C_{18}$ column. Moreover, the CSH fluoro phenyl column showed decreased separation and retention for glutamate and glutamine compared to both the CSH CSH $C_{18}$ column and the CSH phenyl hexyl column.

Example 3: Biomarkers

Standards were prepared in water and diluted with water to make a solution of 100 μMolar for methylmalonic acid, aconitic acid, and succinic acid. Itaconic acid was made in a solution 10 μg/mL. These analytes were then separated using an ACQUITY® UPLC® I-Class LC system (commercially available from Waters Technologies Corporation, Milford, Mass. USA) coupled with a Xevo® TQ S tandem quadrupole mass spectrometer operated in ESI negative mode and in MRM acquisition mode (commercially available from Waters Technologies Corporation, Milford, Mass. USA). Details of the method are described in Tables 6 and 7.

TABLE 6

Liquid Chromatography Conditions

| | |
|---|---|
| Columns | ACQUITY ® UPLC ® CSH $C_{18}$ column; 130 Å 1.7 μm 2.1 × 100 mm |
| | ACQUITY ® UPLC ® CSH Phenyl-Hexyl column; 130 Å 1.7 μm 2.1 × 100 mm |
| | ACQUITY ® UPLC ® CSH Fluoro-Phenyl column; 130 Å 1.7 μm 2.1 × 100 mm |
| | (commercially available from Waters Technologies Corporation, Milford, MA USA) |
| Mobile Phase A | 100% water, 0.1% formic acid (v/v) |
| Mobile Phase B | 100% acetonitrile, 0.1% formic acid (v/v) |
| Column Temperature | 50° C. |
| Injection Volume | 3 μL |
| Sample Diluent | Water |
| Detection | Tandem quadrupole MS MRM mode ESI negative mode |

TABLE 7

Gradient Table

| Time (min) | Flow Rate (mL/min) | % A | % B | Curve |
|---|---|---|---|---|
| Initial | 0.40 | 100.0 | 0.00 | Initial |
| 3.00 | 0.40 | 70 | 30.0 | 6 |
| 3.50 | 0.40 | 5.0 | 95.0 | 6 |
| 6.50 | 0.40 | 5.0 | 95.0 | 6 |
| 7.00 | 0.40 | 100.0 | 0.0 | 6 |

Figure 10A:
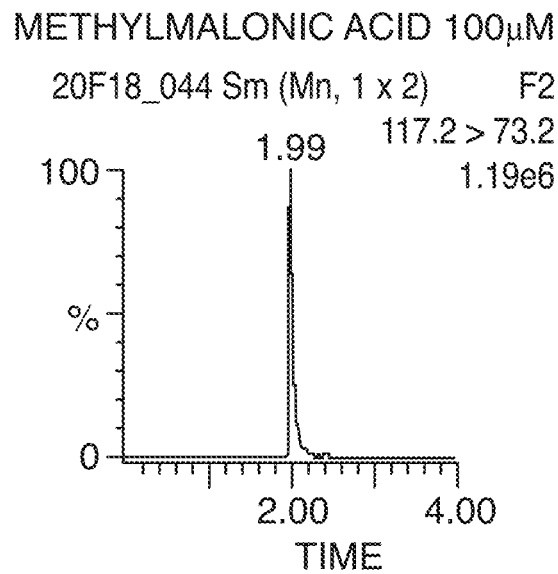
FIG. 10A is a chromatogram for the separation of methylmalonic acid using a CSH $C_{18}$ column, according to an illustrative embodiment of the technology.
Figure 10B:
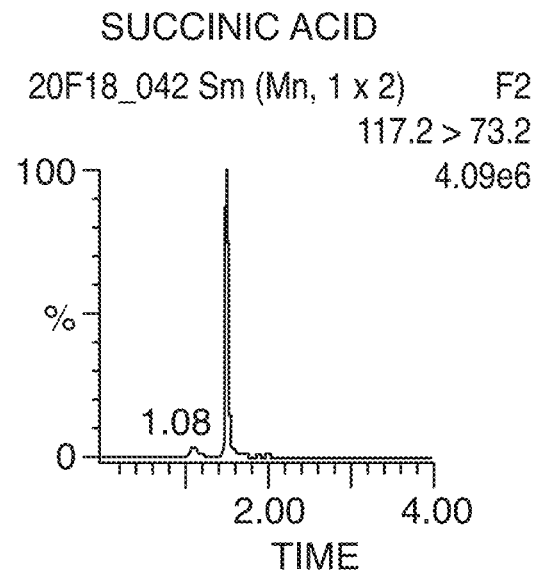
FIG. 10B is a chromatogram for the separation of succinic acid using a CSH $C_{18}$ column, according to an illustrative embodiment of the technology.
Figure 10C:
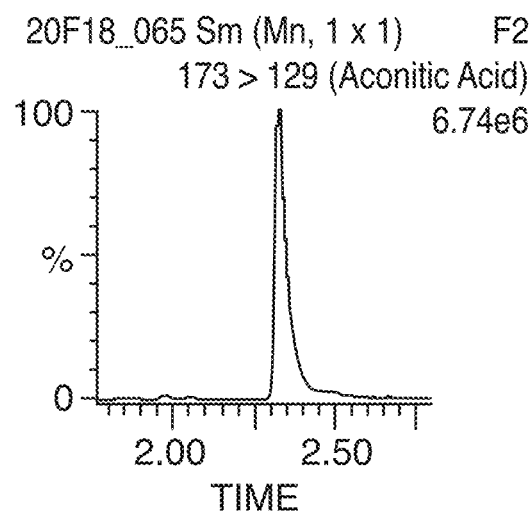
FIG. 10C is a chromatogram for the separation of aconitic acid using a CSH $C_{18}$ column, according to an illustrative embodiment of the technology.
Figure 10D:
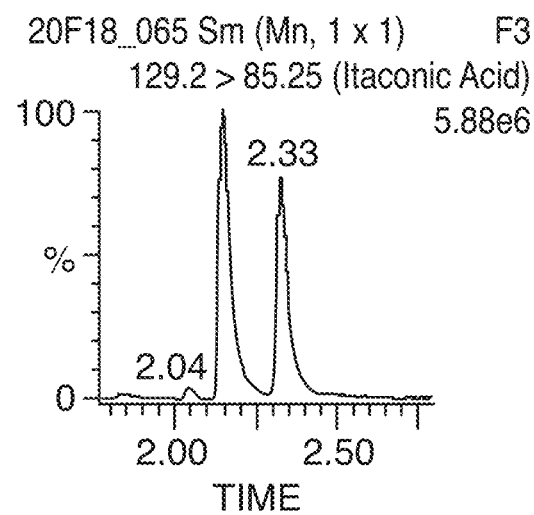
FIG. 10D is a chromatogram for the separation of itaconic acid using a CSH $C_{18}$ column, according to an illustrative embodiment of the technology.

FIGS. 10A-10D show the analysis of biomarkers using a CSH $C_{18}$ sorbent in a reversed phase column. FIG. 10A shows the MRM chromatogram for methylmalonic acid. FIG. 10B shows the MRM chromatogram for succinic acid. FIG. 10C shows the MRM chromatogram for aconitic acid. FIG. 10D shows the MRM chromatogram for itaconic acid.

Figure 11A:
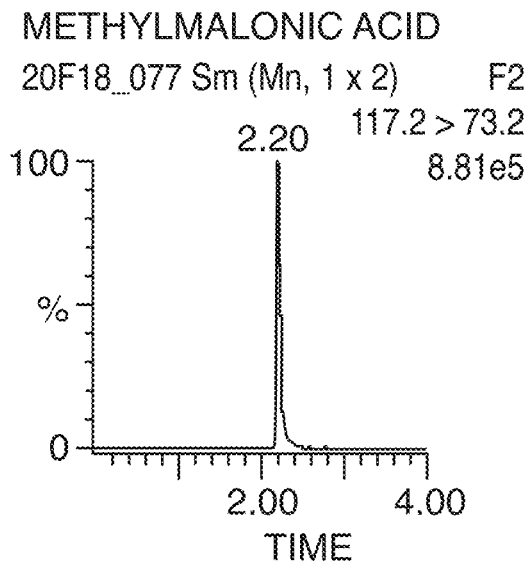
FIG. 11A is a chromatogram for the separation of methylmalonic acid using a CSH phenyl hexyl column, according to an illustrative embodiment of the technology.
Figure 11B:
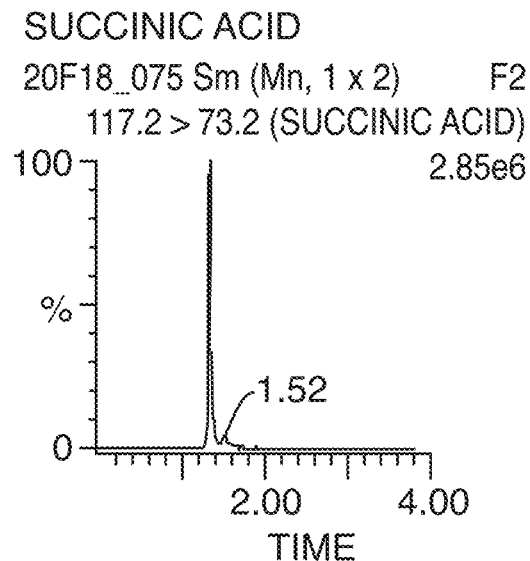
FIG. 11B is a chromatogram for the separation of succinic acid using a CSH phenyl hexyl column, according to an illustrative embodiment of the technology.
Figure 11C:
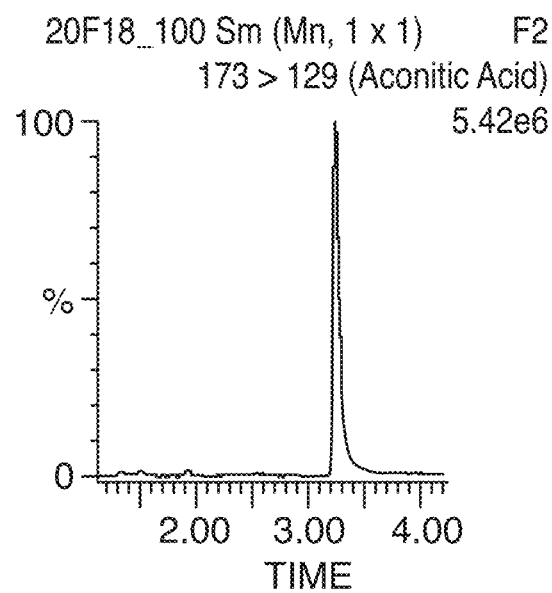
FIG. 11C is a chromatogram for the separation of aconitic acid using a CSH phenyl hexyl column, according to an illustrative embodiment of the technology.
Figure 11D:
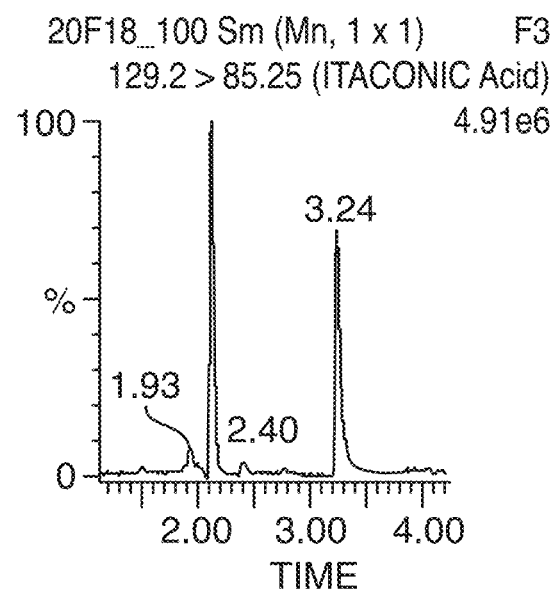
FIG. 11D is a chromatogram for the separation of itaconic acid using a CSH phenyl hexyl column, according to an illustrative embodiment of the technology.

FIGS. 11A-11D show the analysis of biomarkers using a CSH phenyl hexyl sorbent in a reversed phase column. FIG. 11A shows the MRM chromatogram for methylmalonic acid. FIG. 11B shows the MRM chromatogram for succinic acid. FIG. 11C shows the MRM chromatogram for aconitic acid. FIG. 11D shows the MRM chromatogram for itaconic acid.

Figure 12A:
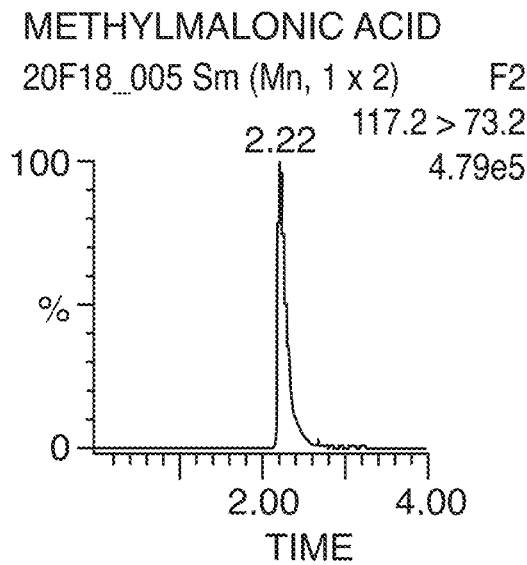
FIG. 12A is a chromatogram for the separation of methylmalonic acid using a CSH fluoro phenyl column, according to an illustrative embodiment of the technology.
Figure 12B:
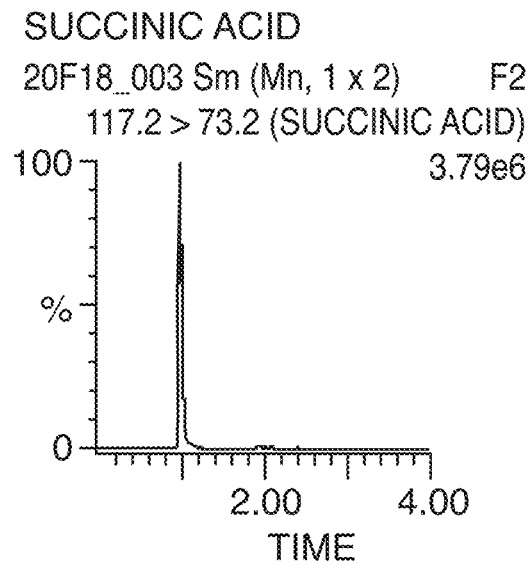
FIG. 12B is a chromatogram for the separation of succinic acid using a CSH fluoro phenyl column, according to an illustrative embodiment of the technology.
Figure 12C:
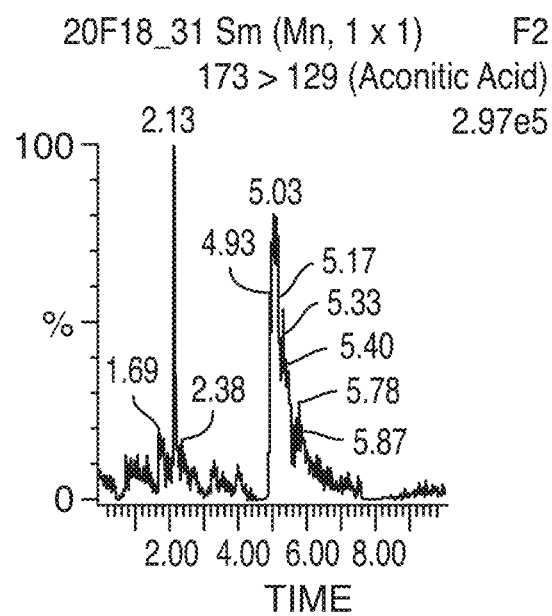
FIG. 12C is a chromatogram for the separation of aconitic acid using a CSH fluoro phenyl column, according to an illustrative embodiment of the technology.
Figure 12D:
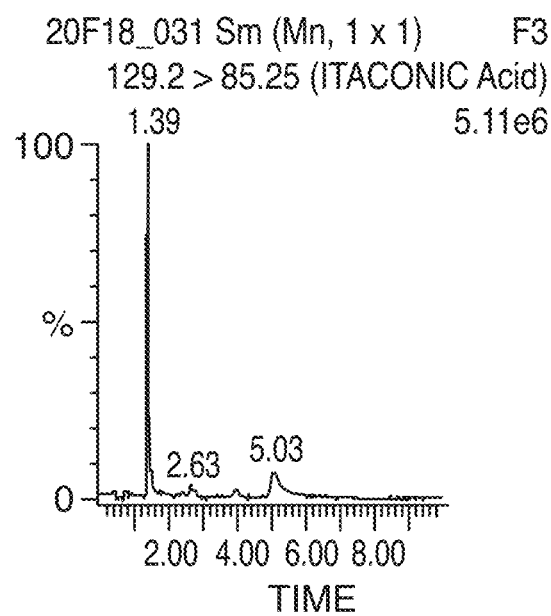
FIG. 12D is a chromatogram for the separation of itaconic acid using a CSH fluoro phenyl column, according to an illustrative embodiment of the technology.

FIGS. 12A-12D show the analysis of biomarkers using a CSH fluoro phenyl sorbent in a reversed phase column. FIG. 12A shows the MRM chromatogram for methylmalonic acid. FIG. 12B shows the MRM chromatogram for succinic acid. FIG. 12C shows the MRM chromatogram for aconitic acid. FIG. 12D shows the MRM chromatogram for itaconic acid.

Example 4: Phosphorylated Sugars

Glucose 6 phosphate standards were prepared in water and diluted with water to make a solution of 100 Molar. This analyte, structure shown below, was then separated using an ACQUITY® UPLC® I-Class LC system (commercially available from Waters Technologies Corporation, Milford, Mass. USA) coupled with a Xevo® TQ S tandem quadrupole mass spectrometer operated in ESI negative mode and in MRM acquisition mode (commercially available from Waters Technologies Corporation, Milford, Mass. USA). Details of the method are described in Tables 8 and 9.

TABLE 8

Liquid Chromatography Conditions

| | |
|---|---|
| Columns | ACQUITY ® UPLC ® CSH $C_{18}$ column; 130 Å 1.7 μm 2.1 × 100 mm |
| | ACQUITY ® UPLC ® CSH Phenyl-Hexyl column; 130 Å 1.7 μm 2.1 × 100 mm |
| | ACQUITY ® UPLC ® CSH Fluoro-Phenyl column; 130 Å 1.7 μm 2.1 × 100 mm |
| | (commercially available from Waters Technologies Corporation, Milford, MA USA) |
| Mobile Phase A | 100% water, 0.1% formic acid (v/v) |
| Mobile Phase B | 100% acetonitrile, 0.1% formic acid (v/v) |
| Column Temperature | 50° C. |
| Injection Volume | 3 μL |
| Sample Diluent | Water |
| Detection | Tandem quadrupole MS MRM mode ESI negative mode |

TABLE 9

Gradient Table

| Time (min) | Flow Rate (mL/min) | % A | % B | Curve |
|---|---|---|---|---|
| Initial | 0.40 | 100.0 | 0.00 | Initial |
| 3.00 | 0.40 | 70 | 30.0 | 6 |
| 3.50 | 0.40 | 5.0 | 95.0 | 6 |
| 6.50 | 0.40 | 5.0 | 95.0 | 6 |
| 7.00 | 0.40 | 100.0 | 0.0 | 6 |

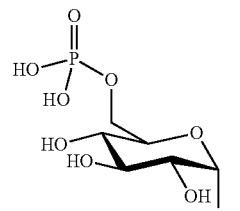

Glucose 6 phosphate structure

Figure 13A:
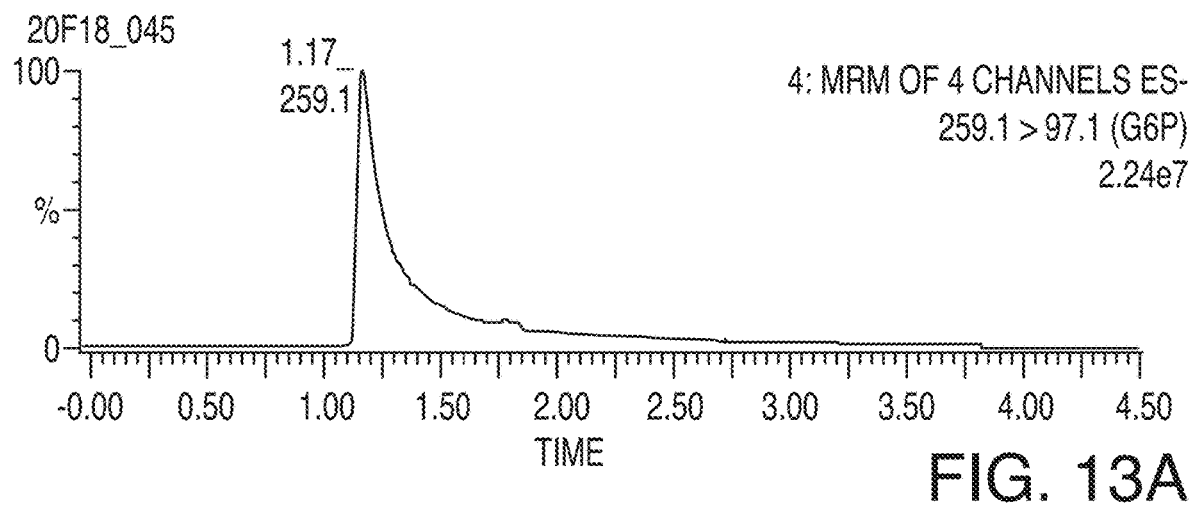
FIG. 13A is a chromatogram for the separation of glucose 6 phosphate using a CSH $C_{18}$ column, according to an illustrative embodiment of the technology.
Figure 13B:
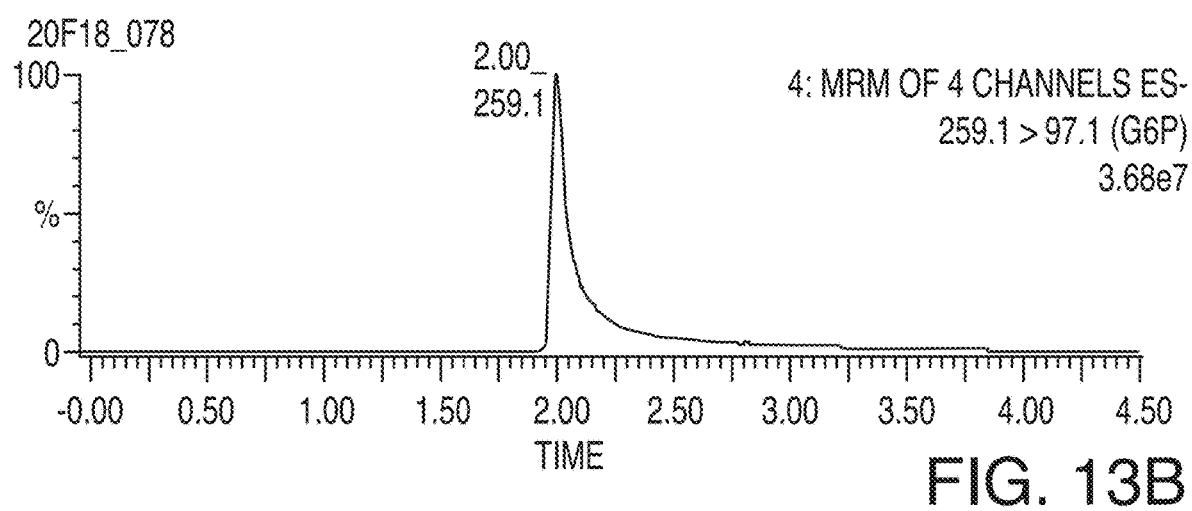
FIG. 13B is a chromatogram for the separation of glucose 6 phosphate using a CSH phenyl hexyl column, according to an illustrative embodiment of the technology.
Figure 13C:
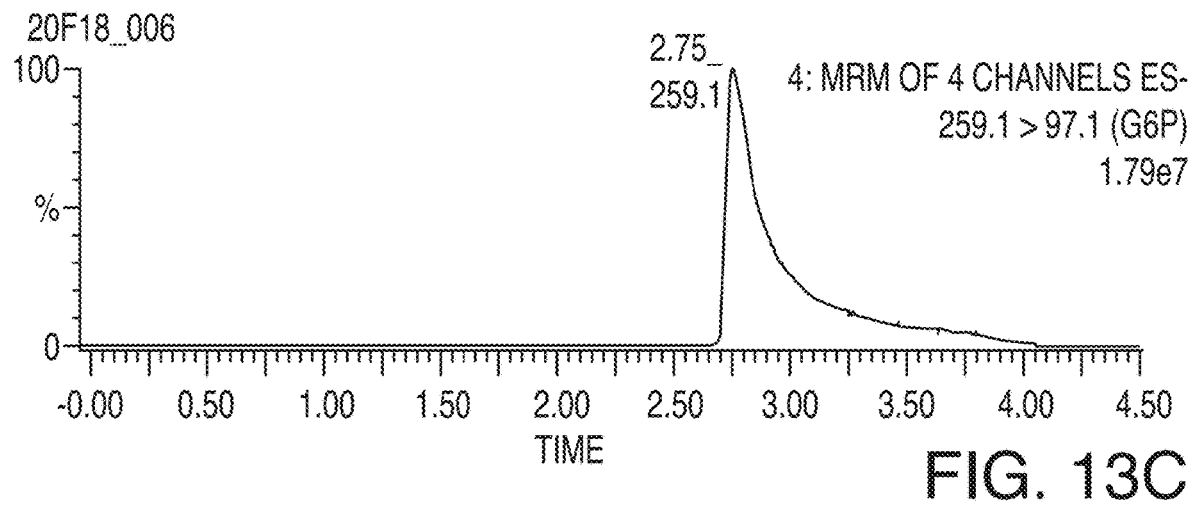
FIG. 13C is a chromatogram for the separation of glucose 6 phosphate using a CSH fluoro phenyl column, according to an illustrative embodiment of the technology.

FIG. 13A shows the analysis of glucose 6 phosphate using a CSH $C_{18}$ sorbent in a reversed phase column. FIG. 13B shows the analysis of glucose 6 phosphate using a CSH phenyl hexyl sorbent in a reversed phase column. FIG. 13C shows the analysis of glucose 6 phosphate using a CSH fluoro phenyl sorbent in a reversed phase column. As can be seen from a comparison of these three stationary phase material, the CSH fluoro phenyl sorbent showed increased separation and retention as compared to the CSH phenyl hexyl stationary phase material, which showed increased separation and retention as compared to the CSH $C_{18}$ stationary phase material.

From all of these examples, it is shown that the anion-exchange characteristics of CSH columns make them useful for separating polar acidic analytes, which are typically poorly retained on reversed-phase columns.

Those skilled in the art will recognize, or be able to ascertain using no more than routine experimentation, numerous equivalents to the specific procedures described herein. Such equivalents were considered to be within the scope of this technology and are covered by the following claims. The contents of all references, issued patents, and published patent applications cited throughout this application are hereby incorporated by reference.

What is claimed is:

1. A mixed-mode chromatography method for the determination of phosphorylated sugars in a sample, the mixed-mode chromatography method comprising:
   obtaining a sample comprising at least one phosphorylated sugar;
   introducing the sample onto a chromatography system comprising a column having a stationary phase material contained inside the column, the stationary phase material having a surface comprising a hydrophobic surface group and at least one ionizable modifier;
   flowing the sample with a mobile phase eluent through the column, wherein the at least one phosphorylated sugar is substantially resolved and retained within seven minutes, the mobile phase eluent comprising water with an additive and acetonitrile with the additive, the mobile phase eluent having a pH less than 6; and
   detecting the at least one phosphorylated sugar using a detector.

2. The mixed-mode chromatography method of claim 1, wherein the pH of the mobile phase eluent is less than 3.

3. The mixed-mode chromatography method of claim 2, wherein the pH of the mobile phase eluent is about 2.7.

4. The mixed-mode chromatography method of claim 1, wherein the additive is 0.1% formic acid.

5. The mixed-mode chromatography method of claim 1, wherein the mobile phase eluent comprises a mobile phase A consisting essentially of 0.1% formic acid in water and a mobile phase B consisting essentially of 0.1% formic acid in acetonitrile.

6. The mixed-mode chromatography method of claim 5, wherein the mobile phase eluent has a linear or step gradient elution comprising
   a. 100% mobile phase A, 0% mobile phase B at an initial time;
   b. 70% mobile phase A, 30% mobile phase B at a time of 3 minutes;
   c. 5% mobile phase A, 95% mobile phase B at a time of 3.5 minutes;
   d. 5% mobile phase A, 95% mobile phase B at a time of 6.5 minutes
   e. 100% mobile phase A, 0% mobile phase B at a time of 7 minutes.

7. The mixed-mode chromatography method of claim 1, wherein the sample with the mobile phase eluent is flowed through the column at a rate from 0.2-1.0 mL/min.

8. The mixed-mode chromatography method of claim 1, wherein the hydrophobic surface group comprises a fluoro-phenyl functional group.

9. The mixed-mode chromatography method of claim 1, wherein the hydrophobic surface group comprises a phenyl-hexyl functional group.

10. The mixed-mode chromatography method of claim 1, wherein the hydrophobic surface group comprises a $C_{18}$ functional group.

11. The mixed-mode chromatography method of claim 1, wherein the detector is a mass spectrometer.

12. A mixed-mode chromatography method for the determination of amino acids in a sample, the mixed mode chromatography method comprising:
   obtaining a sample comprising at least one amino acid;
   introducing the sample onto a chromatography system comprising a column having a stationary phase material contained inside the column, the stationary phase material having a surface comprising a hydrophobic surface group and at least one ionizable modifier;
   flowing the sample with a mobile phase eluent through the column, wherein the at least one amino acid is substantially resolved and retained within seven minutes, the mobile phase eluent comprising water with an additive and acetonitrile with the additive, the mobile phase eluent having a pH less than 6; and
   detecting the at least one amino acid using a detector.

13. The mixed-mode chromatography method of claim 12, wherein the pH of the mobile phase eluent is less than 3.

14. The mixed-mode chromatography method of claim 13, wherein the pH of the mobile phase eluent is about 2.7.

15. The mixed-mode chromatography method of claim 12, wherein the additive is 0.1% formic acid.

16. The mixed-mode chromatography method of claim 12, wherein the mobile phase eluent comprises a mobile phase A consisting essentially of 0.1% formic acid in water and a mobile phase B consisting essentially of 0.1% formic acid in acetonitrile.

17. The mixed-mode chromatography method of claim 16, wherein the mobile phase eluent has a linear or step gradient elution comprising
   a. 100% mobile phase A, 0% mobile phase B at an initial time;
   b. 70% mobile phase A, 30% mobile phase B at a time of 3 minutes;
   c. 5% mobile phase A, 95% mobile phase B at a time of 3.5 minutes;
   d. 5% mobile phase A, 95% mobile phase B at a time of 6.5 minutes
   e. 100% mobile phase A, 0% mobile phase B at a time of 7 minutes.

18. The mixed-mode chromatography method of claim 12, wherein the sample with the mobile phase eluent is flowed through the mixed-mode column at a rate of about 0.2-1.0-mL/min.

19. The mixed-mode chromatography method of claim 12, wherein the hydrophobic surface group comprises a fluoro-phenyl functional group.

20. The mixed-mode chromatography method of claim 12, wherein the hydrophobic surface group comprises a phenyl-hexyl functional group.

21. The mixed-mode chromatography method of claim 12, wherein the hydrophobic surface group comprises a $C_{18}$ functional group.

22. The mixed-mode chromatography method of claim 12, wherein the detector is a mass spectrometer.

23. The mixed-mode chromatography method of claim 12, wherein the at least one amino acid is glutamate, glutamine, isoleucine, or leucine.

\* \* \* \* \*